United States Patent
Mills

(10) Patent No.: US 6,354,976 B1
(45) Date of Patent: Mar. 12, 2002

(54) TRANSMISSIONS, TRANSMISSION LOCK ASSEMBLIES, METHODS OF ADJUSTING A GEAR RATIO OF A TRANSMISSION, AND METHODS OF FORMING A TRANSMISSION SHIFT MECHANISM

(75) Inventor: Ned Mills, Kennewick, WA (US)

(73) Assignee: Speed Control, Inc., Richland, WA (US)

(*) Notice: Subject to any disclaimer, the term of this patent is extended or adjusted under 35 U.S.C. 154(b) by 0 days.

(21) Appl. No.: 09/373,139

(22) Filed: Aug. 11, 1999

Related U.S. Application Data

(63) Continuation-in-part of application No. 09/109,562, filed on Jul. 2, 1998, now Pat. No. 5,964,677.

(51) Int. Cl.[7] .............................................. F16H 29/04
(52) U.S. Cl. ........................................ 475/170; 74/117
(58) Field of Search ................................ 475/170, 162, 475/169; 74/117, 473.26, 483 R; 280/260

(56) References Cited

U.S. PATENT DOCUMENTS

| | | |
|---|---|---|
| 363,629 A | 5/1887 | Grant |
| 1,832,384 A | 11/1931 | Hall et al. |
| 1,872,636 A | 8/1932 | Greening et al. |
| 2,209,417 A | 7/1940 | Obermoser |
| 3,848,474 A | 11/1974 | Epstein |
| 4,164,153 A | 8/1979 | Moritsch et al. |
| 4,299,581 A | 11/1981 | Korosue |
| 4,352,297 A | 10/1982 | Nardi |
| 4,355,545 A * | 10/1982 | Ross ........................... 74/567 |
| 4,660,427 A | 4/1987 | Fenton |
| 4,697,469 A | 10/1987 | Takamiya et al. |
| 4,846,010 A * | 7/1989 | Fujikawa et al. .......... 74/337.5 |
| 4,983,151 A | 1/1991 | Pires |
| 5,081,877 A | 1/1992 | Mercat |
| 5,108,352 A | 4/1992 | Pires |
| 5,454,766 A | 10/1995 | Mills |
| 5,516,132 A | 5/1996 | Simkins |
| 5,632,702 A | 5/1997 | Mills |
| 5,685,794 A | 11/1997 | Willmot |
| 5,964,677 A * | 10/1999 | Mills ........................... 475/170 |

FOREIGN PATENT DOCUMENTS

| | | |
|---|---|---|
| DE | 393180 | 4/1924 |
| EP | 0 208 473 | 1/1987 |
| IT | 332825 | 9/1935 |
| JP | 1722/59 | 3/1959 |
| JP | 63-145851 | 5/1988 |
| JP | 63-285358 | 11/1988 |
| WO | 95/06829 | 3/1995 |

OTHER PUBLICATIONS

U.S. application No. 08/991,815, Mills et al., filed Dec. 16, 1997.

* cited by examiner

*Primary Examiner*—Charles A. Marmor
*Assistant Examiner*—Ha Ho
(74) *Attorney, Agent, or Firm*—Wells, St. John et al.

(57) ABSTRACT

Transmissions, transmission lock assemblies, methods of adjusting a gear ratio of a transmission, and methods of forming a transmission shift mechanism are provided. According to one aspect of the invention, a transmission includes a mount assembly including a mount support adapted to couple about a central axle having a central axis, and an eccentric mount defining an eccentric axis and movably coupled with the mount support allowing radial adjustment of the eccentric mount relative to the central axle intermediate a first position and a second position to adjust a gear ratio of the transmission; and wherein resultant forces are generated responsive to the eccentric axis being spaced from the central axis, and the mount support and the eccentric mount are configured to minimize effects of the resultant forces upon the eccentric mount in positions intermediate the first position and the second position.

38 Claims, 19 Drawing Sheets

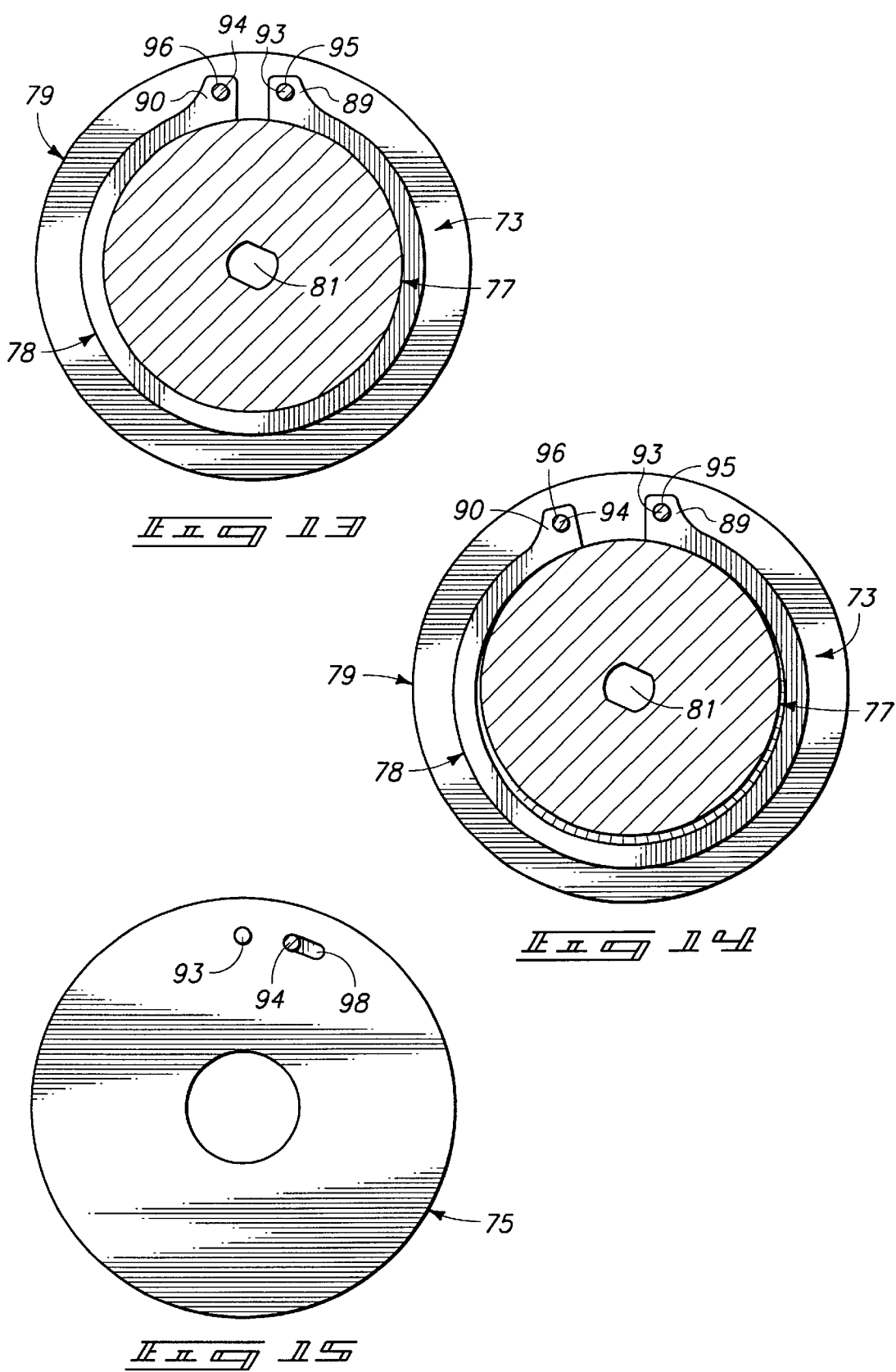

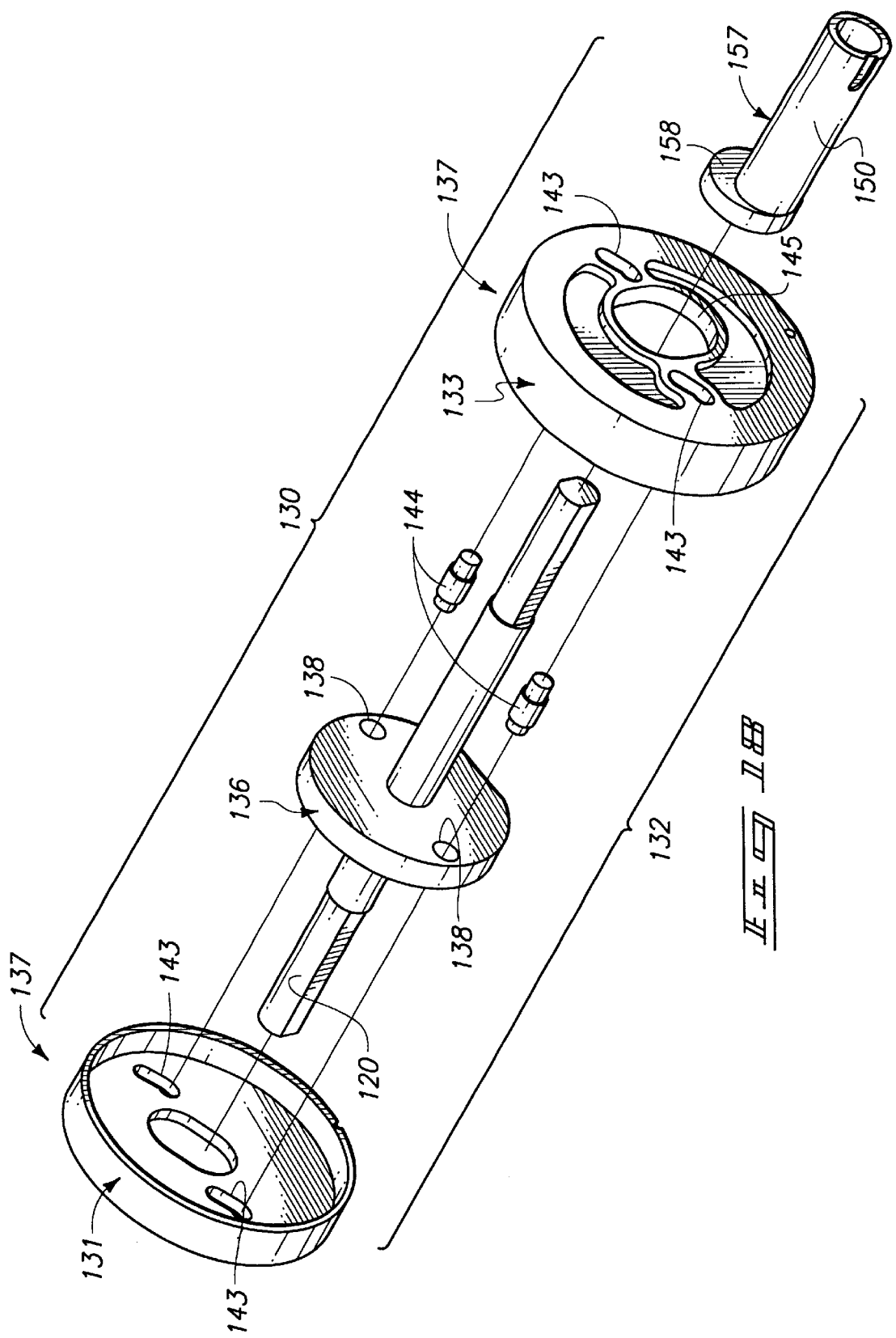

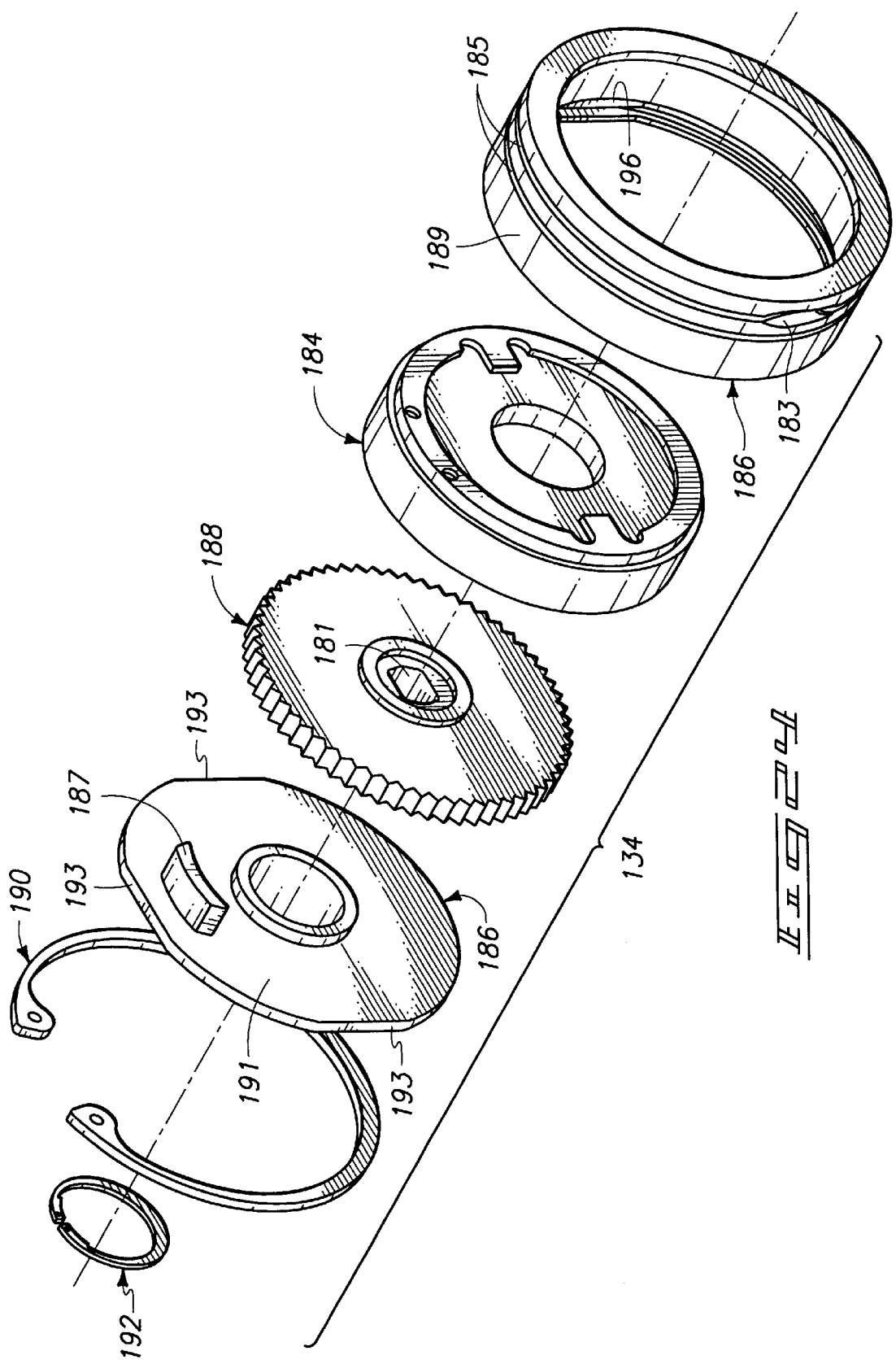

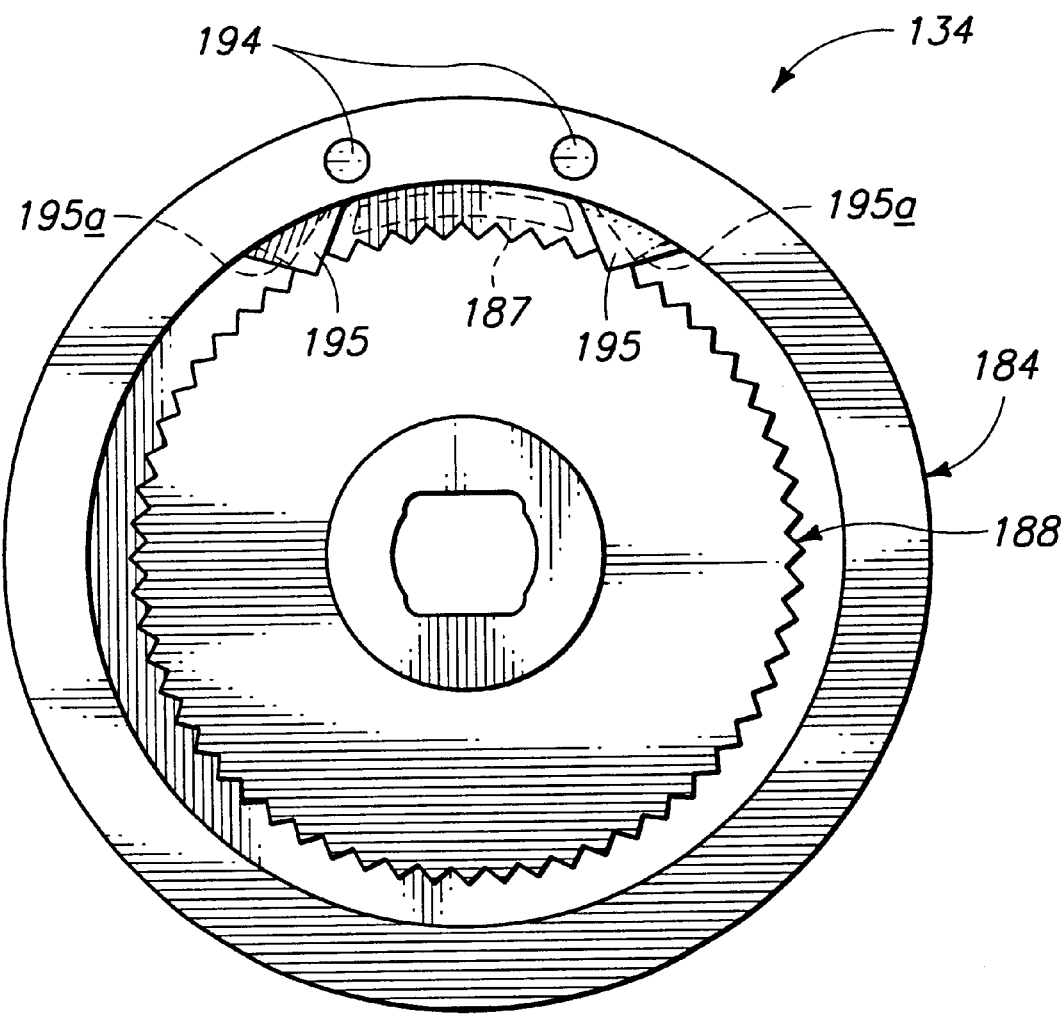

TRANSMISSIONS, TRANSMISSION LOCK ASSEMBLIES, METHODS OF ADJUSTING A GEAR RATIO OF A TRANSMISSION, AND METHODS OF FORMING A TRANSMISSION SHIFT MECHANISM

RELATED PATENT DATA

The present application is a continuation-in-part of patent application Ser. No. 09/109,562 which was filed on Jul. 2, 1998 now U.S. Pat. No. 5,964,677 and which is incorporated by reference herein.

TECHNICAL FIELD

The present invention relates to transmissions, transmission lock assemblies, methods of adjusting a gear ratio of a transmission, and methods of forming a transmission shift mechanism.

BACKGROUND OF THE INVENTION

Changeable speed transmissions for bicycles have been proposed and used for many years. These have included various rear wheel hub transmissions, which typically achieved two or three specified speed reductions, as well as derailleur systems, which use a driving chain as a force transmitting element between selectable rear and/or front sprockets.

An improved transmission is described in U.S. Pat. No. 5,632,702 to Mills (the '702 patent), assigned to the assignee of the present invention and incorporated herein by reference. This patent discloses a continuously variable transmission. This patent further teaches the use of a sprocket which serves as an adjusting mechanism operably connected to an inner eccentric element and outer eccentric element. Adjusting the position of the inner eccentric element and the outer eccentric element adjusts the gearing of the transmission.

The '702 patent teaches the use of a worm gear to provide increased torque to the extension shaft of the disclosed adjustment mechanism. Such a configuration eases the adjustment and selection of the desired gear ratio provided by the transmission. This is favorable to reduce the impact of working forces exerted on the internal components of the transmission during operation.

U.S. patent application Ser. No. 08/991,815, entitled Shift Mechanisms and Methods of Controlling a Transmission, filed Dec. 16, 1997, naming Ned Mills and Benjamin K. Jones as inventors, assigned to the assignee hereof, and incorporated herein by reference, discloses the use of a hydraulic shift mechanism for adjusting the gear ratio of a continuously variable transmission. Such utilizes a master cylinder and slave cylinder configuration to provide shifting of the transmission.

The present invention discloses apparatuses and methods of providing operator control of the gearing of a transmission.

BRIEF DESCRIPTION OF THE DRAWINGS

Preferred embodiments of the invention are described below with reference to the following accompanying drawings.

FIG. 13 is a cross-sectional view of the lock assembly showing a retaining assembly and a downshift member.

FIG. 14 is a cross-sectional view of the lock assembly similar to FIG. 13 illustrating a deformed position of a spring of the retaining assembly.

FIG. 15 is an elevated side view of an upshift member of the lock assembly.

FIG. 18 is an exploded view of a mount assembly of the transmission of FIG. 16.

FIG. 24 is an exploded view of the lock assembly shown in FIG. 23.

FIG. 25 is a side view of components of the lock assembly of FIG. 23.

DETAILED DESCRIPTION OF THE PREFERRED EMBODIMENTS

Figure 1:
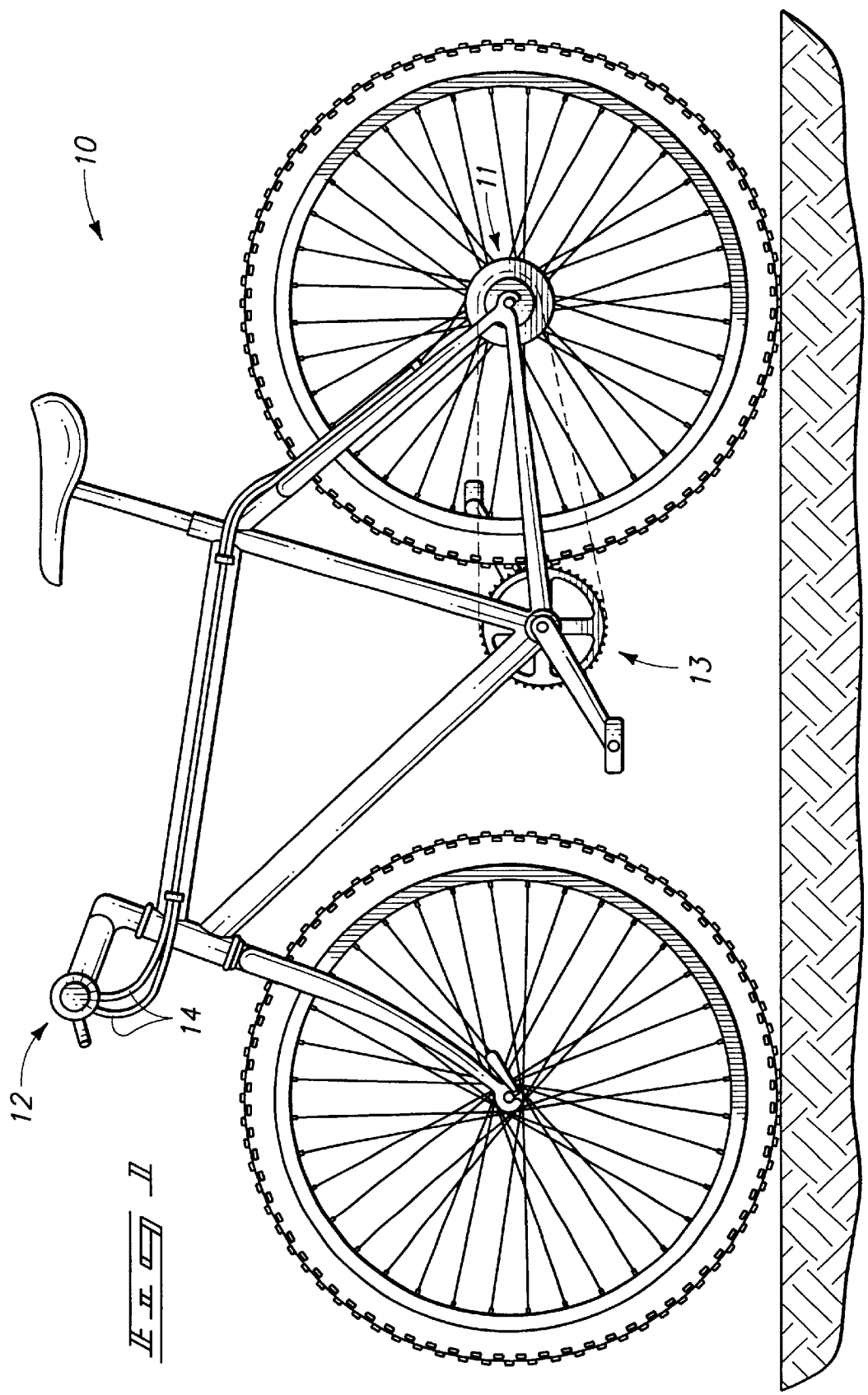
FIG. 1 is an elevated side view of a bicycle embodying the present invention.

This disclosure of the invention is submitted in furtherance of the constitutional purposes of the U.S. Patent Laws "to promote the progress of science and useful arts" (Article 1, Section 8).

According to one aspect of the invention, a transmission comprises: a mount assembly including a mount support adapted to couple about a central axle having a central axis, and an eccentric mount defining an eccentric axis and movably coupled with the mount support allowing radial adjustment of the eccentric mount relative to the central axle intermediate a first position and a second position to adjust a gear ratio of the transmission; and wherein resultant forces are generated responsive to the eccentric axis being spaced from the central axis, and the mount support and the eccentric mount are configured to minimize effects of the resultant forces upon the eccentric mount in positions intermediate the first position and the second position.

Another aspect of the invention provides a transmission comprising: a mount assembly including a mount support adapted to couple about a central axle having a central axis, and an eccentric mount defining an eccentric axis and movably coupled with the mount support allowing radial adjustment of the eccentric mount relative to the central axle intermediate a first position and a second position to adjust a gear ratio of the transmission; and wherein one of the mount support and the eccentric mount includes at least one pin and the other of the mount support and the eccentric mount includes at least one contoured cam slot configured to receive the pin to form a cam follower to define a path of travel for the eccentric mount intermediate the first position and the second position.

Another aspect of the invention includes a transmission lock assembly comprising: a gear adapted to couple in a fixed orientation with a central axle; a housing assembly configured to rotate in opposing directions about the gear responsive to applied shift forces and including: a first housing having at least one catch movable between an engaged position mated with the gear and a spaced position separated from the gear; and a second housing having a tang positioned adjacent the at least one catch of the first housing; and wherein the tang moves the at least one catch from the engaged position to the spaced position responsive to the applied shift forces to permit rotation of the housing assembly about the gear.

The invention provides in another aspect a transmission adapted to couple with a central axle having a central axis, the transmission comprising: a drive member configured to rotate about the central axle responsive to an application of a drive force to the drive member; a driven member configured to rotate about the central axle responsive to the application of the drive force to the drive member; an orbiter configured to couple the drive member and the driven member; a mount assembly including a mount support adapted to couple about the central axle, and an eccentric mount coupled with the orbiter and defining an eccentric axis and being movably coupled with the mount support allowing radial adjustment of the eccentric mount and orbiter relative to the central axle intermediate a first position and a second position to adjust a gear ratio of the transmission; and wherein resultant forces are generated responsive to the eccentric axis being spaced from the central axis, and the mount support and the eccentric mount are configured to minimize effects of the resultant forces upon the eccentric mount in positions intermediate the first position and the second position.

Another aspect includes a method of adjusting a gear ratio of a transmission comprising: providing a transmission shift mechanism including a mount support coupled with an eccentric mount, and the mount support and the eccentric mount being individually configured to minimize effects of resultant forces upon the eccentric mount during the adjusting the gear ratio of the transmission; and moving the eccentric mount intermediate a first position and a second position relative to the mount support providing the adjusting and creating the resultant forces.

Another aspect of the invention provides a method of adjusting a gear ratio of a transmission comprising: providing a transmission shift mechanism including a mount support coupled with an eccentric mount which defines an eccentric axis; providing the mount support about a central axle which defines a central axis; and moving the eccentric mount relative to the mount support intermediate a first position wherein the eccentric axis is coaxial with the central axis and a second position wherein the eccentric axis is spaced from the central axle to provide the adjusting, the moving further comprising moving the eccentric mount along a path of movement substantially perpendicular to vector directions of resultant forces created during the moving.

Yet another aspect of the invention includes a method of forming a transmission shift mechanism comprising: providing a mount support; providing an eccentric mount; forming a contoured cam slot within one of the mount support and the eccentric mount substantially perpendicular to vector directions of resultant forces created during gear ratio adjusting of a transmission using the transmission shift mechanism; providing a pin upon the other of the mount support and the eccentric mount; and coupling the pin within the contoured cam slot to guide moving of the eccentric mount relative to the mount support.

Referring to FIG. 1, a bicycle 10 embodying the present invention is illustrated. More specifically, bicycle 10 comprises a continuously variable transmission 11 and a shift mechanism therefor. The disclosed shift mechanism is described herein with reference to a continuously variable transmission, such as the transmission disclosed in the '702 patent. The described bicycle transmission is exemplary. It is to be understood that shift mechanisms in accordance with the present invention may be utilized in other bicycle applications or with other transmissions. In addition, shift mechanisms of the present invention can be used or modified for use in vehicles other than bicycles.

Transmission 11 is located within the rear hub of bicycle 10 in the depicted embodiment. Transmission 11 is configured to receive a driving force from a crank arrangement 13 of bicycle 10. A conventional chain can be utilized to translate forces input via crank 13 to transmission 11.

Bicycle 10 includes a control assembly 12 operable to permit a user to selectively control the shift mechanism and the gearing ratio of transmission 11. As described in detail below, plural cables 14 couple control assembly 12 with transmission 11. Responsive to operator control utilizing assembly 12, the gear ratio of transmission 11 can be adjusted dependent upon the desired speed. More specifically, control assembly 12 is operable to control the position of an eccentric mount relative to a mount support as described below.

Figure 2:
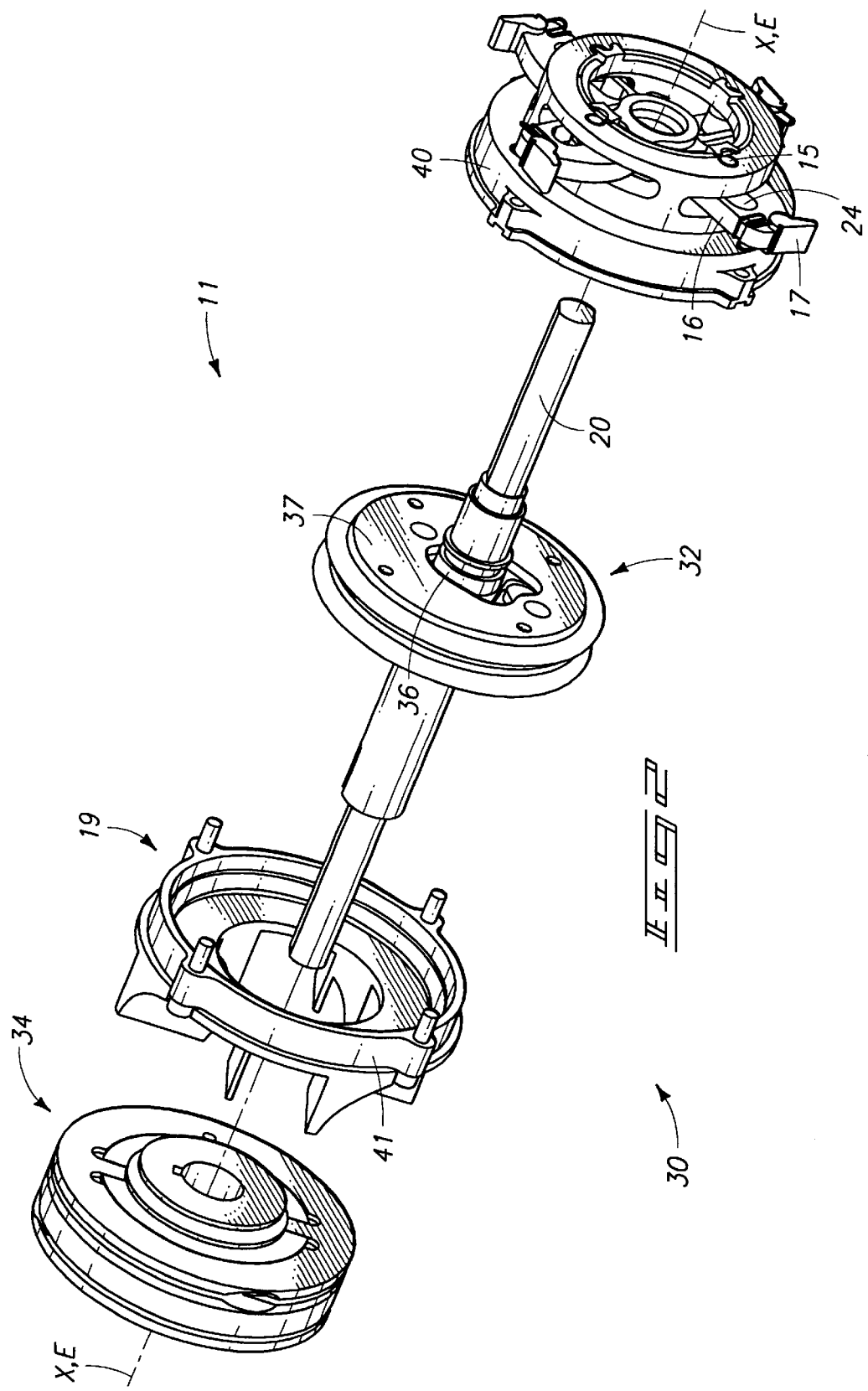
FIG. 2 is an exploded view of a shift mechanism and continuously variable transmission components of the bicycle.

Referring to FIG. 2, one embodiment of continuously variable transmission 11 is illustrated in detail. The illustrated continuously variable transmission 11 includes an orbiter 19 configured for rotation about a central axle 20. The rear wheel of bicycle 10 is configured to rotate about axle 20. Axle 20 defines a central axis X—X.

Figure 3:
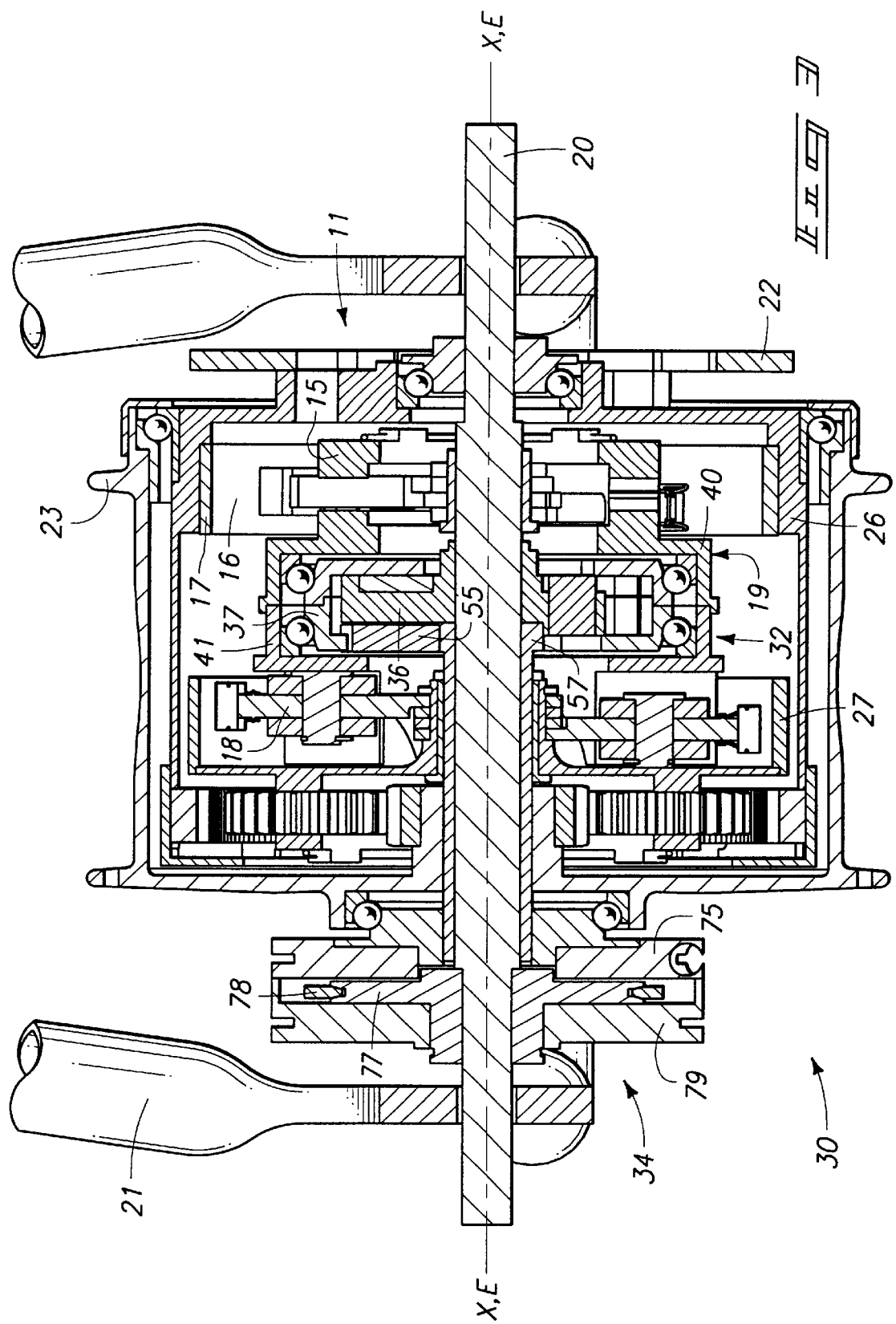
FIG. 3 is a cross-sectional view of the transmission of FIG. 2 mounted upon a frame of a bicycle.

Orbiter 19 comprises a right housing 40 and a left housing 41. Right housing 40 of orbiter 19 includes a plurality of input vanes 16. Left housing 41 includes a plurality of slots configured to couple with plural output vanes (output vanes 18 of transmission 11 are shown in FIG. 3). Input vanes 16 and output vanes 18 are configured for rotation about central axle 20 of bicycle 10. Orbiter 19 is provided to operably couple a drive member 22 and a driven member 23 using input vanes 16 with output vanes 18. Input vanes 16 individually include a tooth 17 configured to engage an input drive member such as an input ratchet, or other drive member, as described below. Further, input vanes 16 are configured to couple with orbiter 19. More specifically, orbiter 19 includes plural pins 15 and input vanes 16 individually include a corresponding slot 24. Slots 24 are configured to receive pins 15 in the described embodiment.

Orbiter 19 is configured for rotational movement about a variable eccentric axis E—E of an eccentric mount described below. Eccentric axis E—E is coaxial and parallel with central axis X—X in FIG. 2. The axis of rotation of orbiter 19 is radially adjustable with respect to central axis X—X. Adjustment of the axis of rotation of orbiter 19 adjusts the gear ratio of transmission 11 as described in detail in the '702 patent.

A shift mechanism 30 is also illustrated in FIG. 2. The depicted shift mechanism 30 comprises a mount assembly 32 and a lock assembly 34. Mount assembly 32 comprises a mount support 36 and an eccentric mount 37. Mount support 36 is provided about central axis 20. Eccentric mount 37 defines eccentric axis E—E. Orbiter 19 is configured to rotate about eccentric axis E—E and eccentric mount 37 of mount assembly 32.

Eccentric mount 37 is movably coupled with mount support 36 to provide radial adjustment of eccentric axis E—E relative to central axis X—X. Radial adjustment of the position of eccentric mount 37 (and eccentric axis E—E) with respect to mount support 36 and central axis X—X adjusts the gear ratio of transmission 11.

As described in detail below, eccentric mount 37 slides between predefined first and second extreme positions during adjustment of the gearing ratio of the associated transmission 11 (the first and second extreme positions of eccentric mount 37 with respect to mount support 36 are illustrated below in FIG. 5 and FIG. 6, respectively). In addition, eccentric mount can be maintained or locked at any location in between the extreme first and second positions to provide the desired gearing ratio. As illustrated, eccentric axis E—E is coaxial with central axis X—X when eccentric mount 37 is provided in the first position.

Referring to FIG. 3, transmission 11 is depicted mounted within a rear hub of bicycle 10. In particular, transmission 11 is mounted upon central axle 20 which comprises the rear axle of bicycle 10 in the depicted embodiment. Central axle 20 is received within frame 21 of bicycle 10. In the preferred embodiment, central axle 20 is keyed for receipt within frame 21 of bicycle 10. Preferably, central axle 20 is locked to frame 21 and fixed thereto.

Transmission 11 is coupled with drive member 22 and driven member 23. Members 22, 23 comprise individual rotatable members. Drive member 22 and driven member 23 are configured to rotate about central axle 20 responsive to an application of a driving force (e.g., an external peddling force input via crank 13) to drive member 22.

In the depicted arrangement, drive member 22 comprises a drive sprocket. Drive member 22 operates as an input drive element which is chain driven from crank 13. Drive member 22 is operably coupled with an input ratchet 26 to impart driving force to ratchet 26. Driving engagement is provided between a drive ring of input ratchet 26 and teeth 17 of input vanes 16.

One embodiment of driven wheel hub 23 comprises a bicycle wheel hub. Driven member or hub 23 is operably coupled to an output ratchet 27. Driven member 23 and output ratchet 27 are configured to rotate about central axis X—X in response to sequential driving engagement between the outer ends of a plurality of output vanes 18 and a driven ring of output ratchet 27. Operation of exemplary transmission 11 is described in further detail in the '702 patent.

Shift mechanism 30 is operable to adjust transmission 11 responsive to operator input via control assembly 12. In particular, shift mechanism 30 is configured to adjust the gear ratio of transmission 11 intermediate drive member 22 and driven member 23. In one embodiment, transmission 11 provides an adjustable gear ratio within a range of 1 to 1 and 3.5 to 1.

Orbiter 19 is operable to rotate about eccentric mount 37. Plural bearing races are provided intermediate orbiter 19 and eccentric mount 37. The operator of bicycle 10 can control the gearing ratio of transmission 10 by adjustment of the position of eccentric mount 37 (and eccentric axis E—E defined thereby) relative to central axle 20 and central axis X—X.

Lock assembly 34 is mounted about central axle 20 and outside of driven member 23 in the depicted embodiment. Lock assembly 34 is coupled with mount assembly 32 in the described embodiment via a shift tube 57. Lock assembly 34 is provided in the preferred embodiment to lock the position of eccentric mount 37 relative to mount support 36 and central axle 20. In addition, lock assembly 34 is operable to control the movement of eccentric mount 37 with respect to mount support 36 and reduce feedback forces applied to control assembly 12. Such feedback forces can comprise resultant forces described below.

Figure 4:
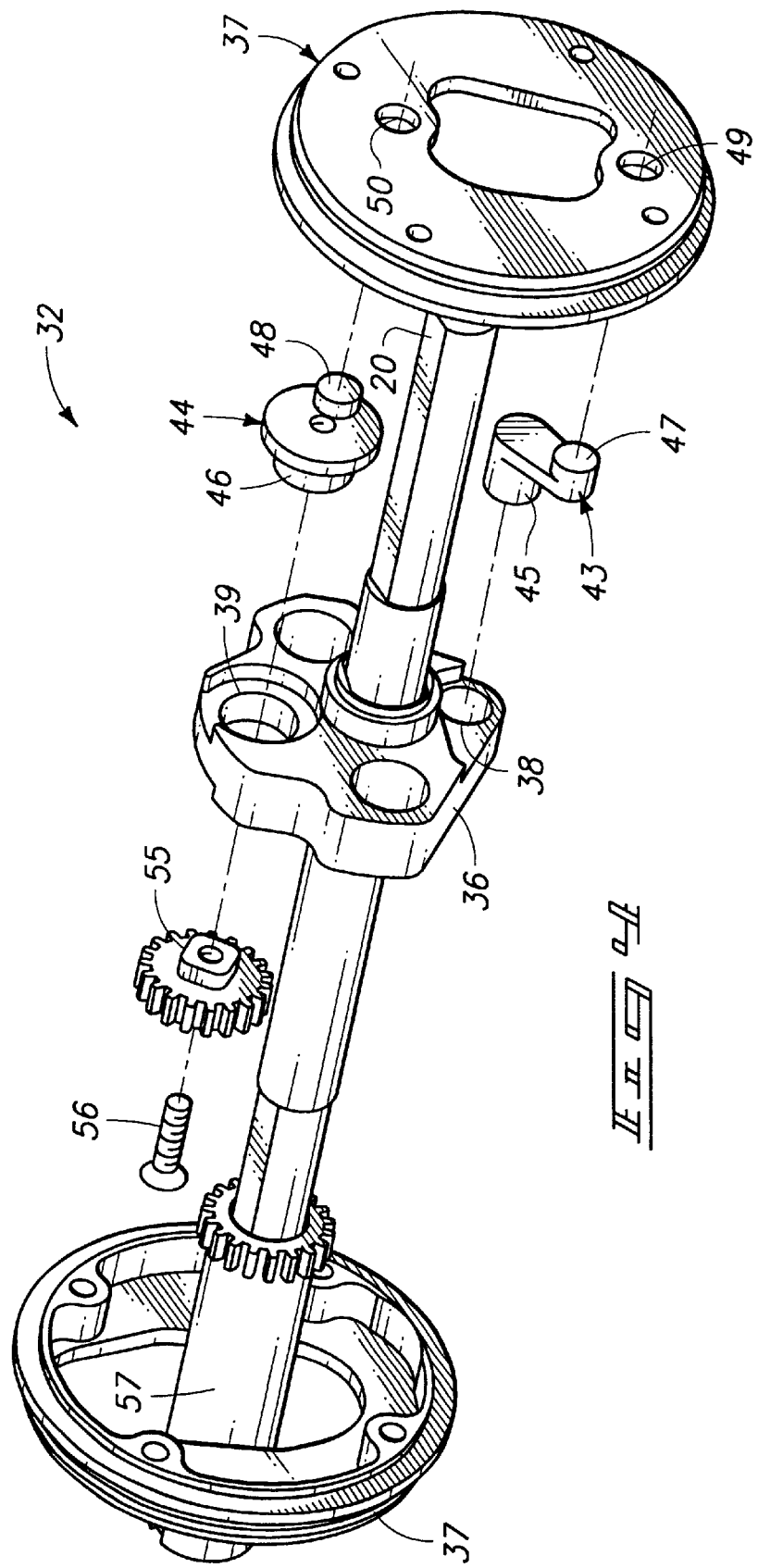
FIG. 4 is an exploded view of a mount assembly of the shift mechanism.

Referring to FIG. 4, internal components of mount assembly 32 are illustrated. Mount support 36 is shown provided upon central axle 20. In the depicted arrangement, mount support 36 is affixed to central axle 20 in a predefined orientation. In particular, mount support 36 does not move with respect to central axle 20.

Mount support 36 forms a boss in the described embodiment. Mount support 36 also includes plural bores (only two bores 38, 39 are labelled as such in FIG. 4). Given the fixed relationship of mount support 36 with respect to central axle 20 and frame 21, displacements of eccentric mount 37 occur along a predefined path intermediate the first and second extreme positions responsive to input from control assembly 12.

Plural links including an idle link 43 and a shift link 44 are configured for engagement with mount support 36 and eccentric mount 37. Idle link 43 and shift link 44 operate to define a linkage having plural bars to couple mount support 36 and eccentric mount 37. Links 43, 44 are individually configured to rotate with respect to pivots 45, 46 which are received within respective bores 38, 39 of mount support 36.

Eccentric mount 37 is shown disassembled into right and left housing portions in FIG. 4. The right housing of eccentric mount 37 includes plural apertures 49, 50. Links 43, 44 include respective pivots 47, 48 which are configured for reception within corresponding apertures 49, 50 of right housing of eccentric mount 37.

Shift link 44 is configured to couple with a shift gear 55 using a through bolt 56. As described in detail below, shift gear 55 is configured to mate with shift tube 57 to provide operative shifting and gear ratio adjustment of transmission 11. Shift tube 57 is fixed to lock assembly 34 and is configured to rotate about central axle 20 as discussed in detail below. Shift link 44 is adapted to be driven by control assembly 12 via shift gear 55 and shift tube 57.

Figure 5:
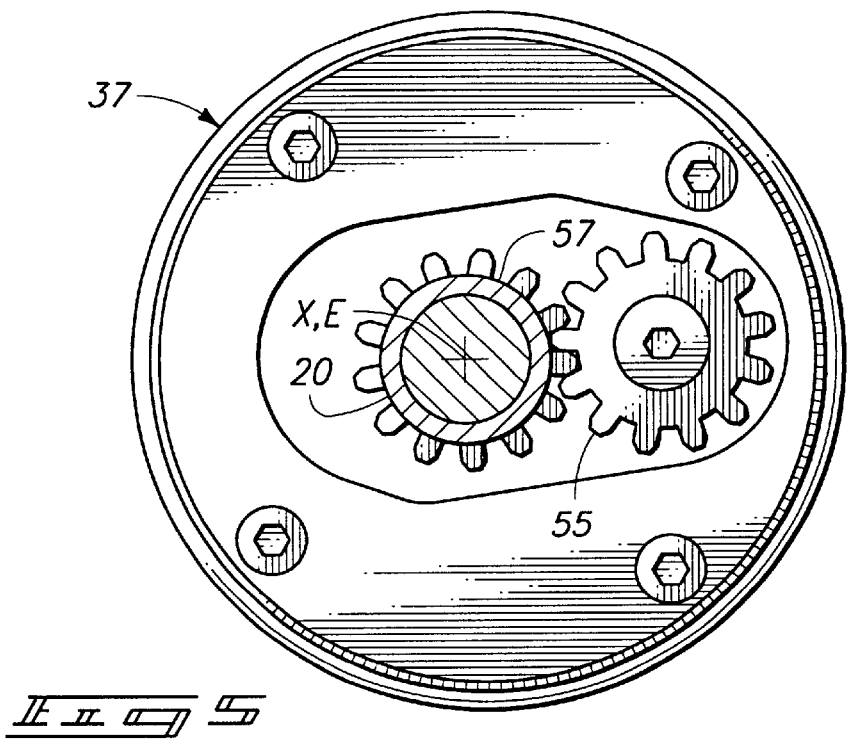
FIG. 5 is a side view of an eccentric mount of the mount assembly in a first extreme position.
Figure 6:
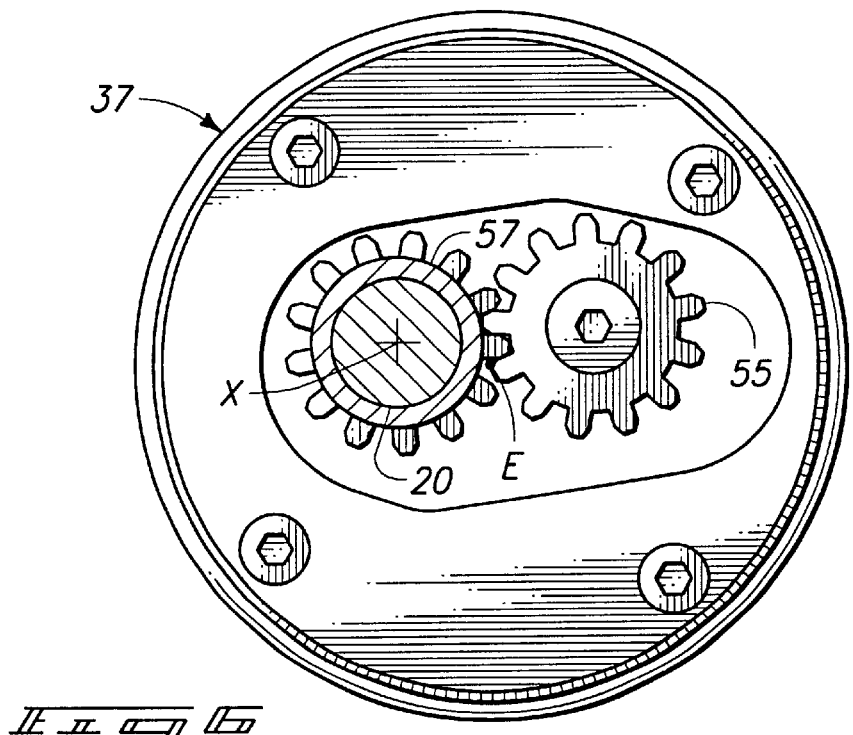
FIG. 6 is a side view of the eccentric mount of the mount assembly in a second extreme position.

Referring to FIG. 5 and FIG. 6, movement of eccentric mount 37 and eccentric axis E—E relative to mount support 36 and central axle 20 and central axis X—X is described. Eccentric mount 37 is configured to move intermediate the first extreme position shown in FIG. 5 to the second extreme position illustrated in FIG. 6.

In the first extreme position of eccentric mount 37 shown in FIG. 5, transmission 11 is locked-up and provides a gear ratio of approximately 1:1. In the second extreme position of eccentric mount 37 shown in FIG. 6, a gear ratio of approximately 3.5:1 is provided. An operator can control the position of eccentric mount 37 to provide any desired gear ratio between the first extreme position of FIG. 5 (1:1) and the second extreme position of FIG. 6 (3.5:1) utilizing control assembly 12 coupled with shift tube 57 and shift gear 55.

As shown, central axis X—X and eccentric axis E—E are provided in a coaxial arrangement in FIG. 5. Central axis X—X and eccentric axis E—E are also parallel. Responsive to user control via control assembly 12, shift tube 57 and shift gear 55 rotate to adjust the position of eccentric mount 37 relative to mount support 36. Offsetting eccentric mount 37 also operates to offset orbiter 19 providing adjustment of the gear ratio of transmission 11. Eccentric axis E—E is offset relative to central axis X—X in the second extreme position shown in FIG. 6.

Figure 7:
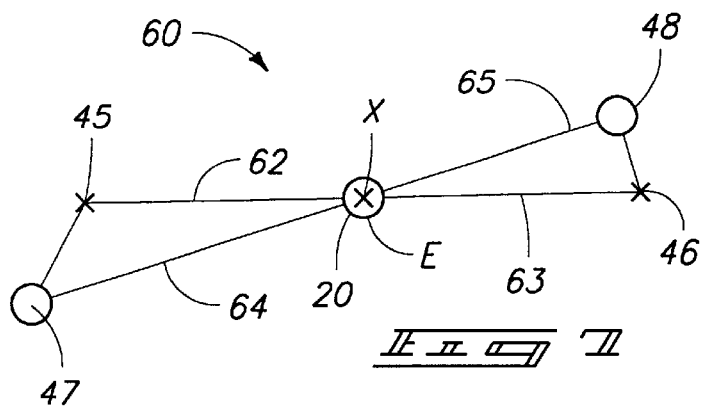
FIG. 7 is a diagrammatic representation of linkages of the mount assembly corresponding to the first extreme position.
Figure 8:
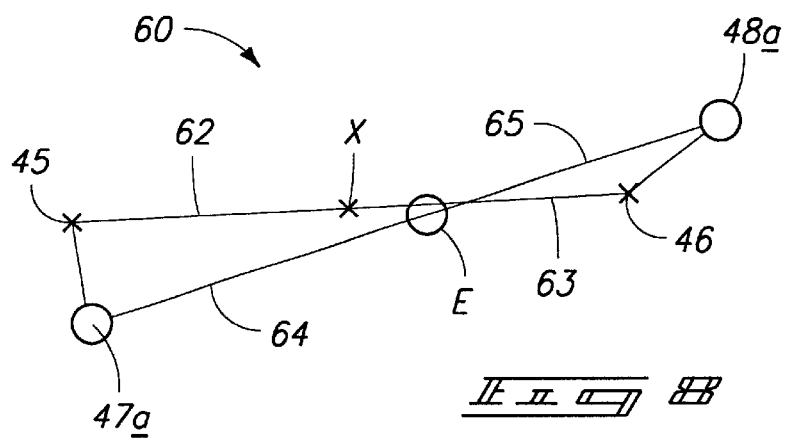
FIG. 8 is a diagrammatic representation of linkages of the mount assembly corresponding to the second extreme position.

Referring to FIG. 7 and FIG. 8, a linkage 60 coupling mount support 36 with eccentric mount 37 is described. FIG. 7 corresponds to the first extreme position of eccentric mount 37 with respect to mount support 36 shown in FIG. 5. FIG. 8 corresponds to the second extreme position of eccentric mount 37 with respect to mount support 36 shown in FIG. 6.

Idle link 43, shift link 44, mount support 36, and eccentric mount 37 define linkage 60 shown in FIG. 7 and FIG. 8. Linkage 60 comprises a four bar linkage in the described embodiment. Linkage 60 includes plural linkages 62–65. First and second linkages 62, 63 are defined from central axle 20 to respective pivots 45, 46 of idle link 43 and shift link 44. Linkages 62, 63 may be referred to as ground linkages. A center of eccentric mount 37 (corresponding to eccentric axis E—E) and pivots 47, 48 of respective links 43, 44 define linkages 64, 65. Linkages 62–65 provide four bar linkage 60 movable intermediate the first extreme position shown in FIG. 7 and the second extreme position shown in FIG. 8. Pivots 47, 48 are positioned in the orientation of FIG. 7 during positioning of eccentric mount 37 in the first extreme position. Positions 47a, 48a illustrate positioning of the pivots during positioning of eccentric mount 37 in the second extreme position. Axis X—X and axis E—E are coaxial in the illustration of FIG. 7. FIG. 8 illustrates an offset orientation of axis X—X and axis E—E.

Figure 9:
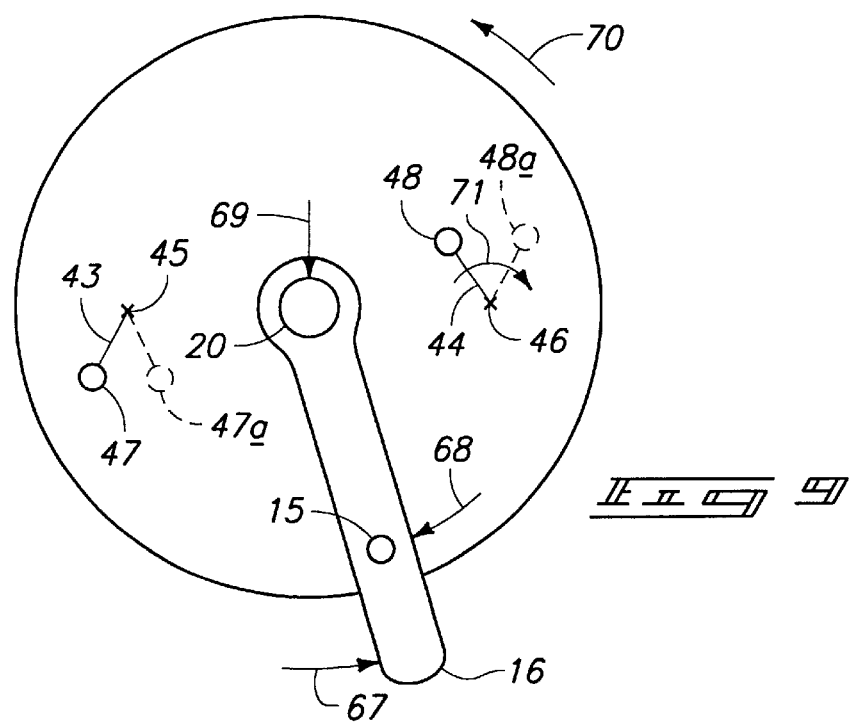
FIG. 9 is a diagrammatic illustration representing forces acting upon the transmission during loading thereof.

Referring to FIG. 9, positioning of pivots 47, 48 of respective links 43, 44 in first and second extreme positions corresponding to orbiter 19 being centered about central axle 20 and offset with respect to central axle 20 are illustrated. Pivots 47, 48 correspond to orbiter 19 being in the first position and pivot positions 47a and 48a correspond to orbiter 19 being in the second position. Providing radial adjustment or spacing of eccentric axis E—E with respect to central axis X—X (offsetting of the axes) generates resultant forces.

More specifically, at least one resultant force is generated responsive to eccentric axis E—E being offset with respect to central axis X—X and application of a driving (e.g., peddling) force via drive member 22. In the preferred embodiment, mount assembly 32 is configured to utilize at least one resultant force to assist with movement of eccentric mount 37 with respect to mount support 36.

During operation under loading conditions, such as during peddling, individual input vanes 16 are individually subjected to rotational forces represented by arrows 67, 68 (only one input vane 16 is represented in FIG. 9). Arrow 67 represents the force acting upon vane 16 responsive to an external peddling force applied via drive member 22. Arrow 68 represents a force acting upon vane 16 from orbiter 19 and pin 15 in a direction opposite to the direction of the force represented by arrow 67.

Application of force 67 in combination with offsetting of orbiter 19 with respect to central axle 20 generates a resultant tangential force 70 provided about central axle 20. Tangential force 70 is applied about the circumference of transmission 11.

Providing offsetting of orbiter 19 with respect to central axis X—X results in a downforce represented by arrow 69 upon axle 20. Downforce 69 urges orbiter 19 to return to the first extreme position wherein axis X—X and E—E are coaxial. In conventional configurations, downforce 69 has been noticed to feedback through the shift mechanism to the associated control assembly. Such requires the operator to continue to apply force to control assembly to resist the feedback forces.

The arrangement of mount assembly 32 including mount support 36 and eccentric mount 37 in accordance with the present invention significantly reduces the effects of the resultant forces generated during offsetting of orbiter 19 with respect to central axle 20. Links 43, 44 are positioned within mount assembly 32 to utilize resultant forces 69, 70 to assist with movement of eccentric mount 37 from the first extreme position in a direction toward the second extreme position.

More specifically, once orbiter 19 is offset from central axle 20, resultant downforce 69 acts upon transmission 11. Responsive to operator control, shift link 44 experiences a radial torque from shift gear 55 as represented by arrow 71. Such radial torque 71 begins movement of pivots 47, 48 towards respective pivot positions 47a, 48a. Resultant forces 69, 70 tend to oppose rotation of shift link 44 in a clockwise direction about pivot 46. However, following application of radial torque 71 about pivot 46, resultant forces 69, 70 aid with rotation of idle link 43 about pivot 45 from the depicted position of pivot 47 towards pivot position 47a. Resultant forces 69, 70 aid with rotation of link 43 about pivot 45 until pivots 45, 47 are substantially aligned with forces 69, 70.

Once pivots 45, 47 of link 43 are substantially aligned with resultant forces 69, 70, downforce 69 assists with the rotation of shift link 44 in a clockwise direction with respect to pivot point 46 and corresponding to movement of pivot 48 toward pivot position 48a. Thus, subsequent to application of radial torque 71, resultant forces initially assist with rotation of link 43 in a counterclockwise direction with respect to pivot 45 and subsequently assist with clockwise rotation of link 44 with respect to pivot 46. Such assists in movement of eccentric mount 37 from the first extreme position towards the second extreme position.

Figure 10:
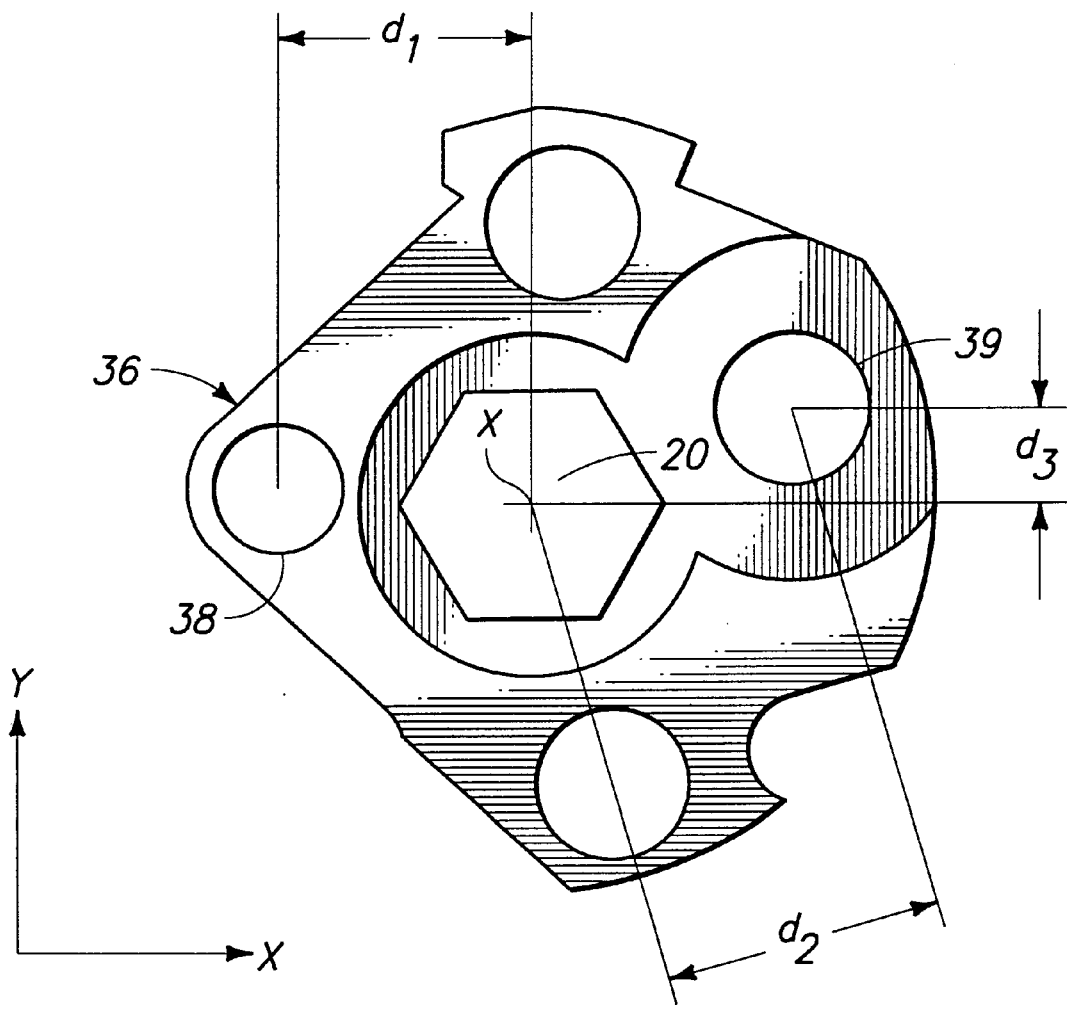
FIG. 10 is an elevated front view of a mount support of the mount assembly.

Referring to FIG. 10 mount support 36 is shown in an elevational side view about central axle 20. Idle link pivot bore 38 and a shift link pivot bore 39 are illustrated. As shown, the center of bore 38 is provided a fixed distance $d_1$ from central axis X—X. In the described embodiment, the center of bore 38 lies in the same x plane as axis X—X and is provided a distance $d_1$ of 0.554 inches from central axis X—X. The center of bore 39 is provided a fixed distance $d_2$ equal to 0.650 inches from central axis X—X. In addition, the center of bore 39 is provided a distance $d_3$ equal to 0.222 inches in the y direction relative to central axis X—X. Although the configuration of mount support 36 depicted in FIG. 10 is preferred, other configurations or constructions may be utilized in accordance with the present invention.

Figure 11:
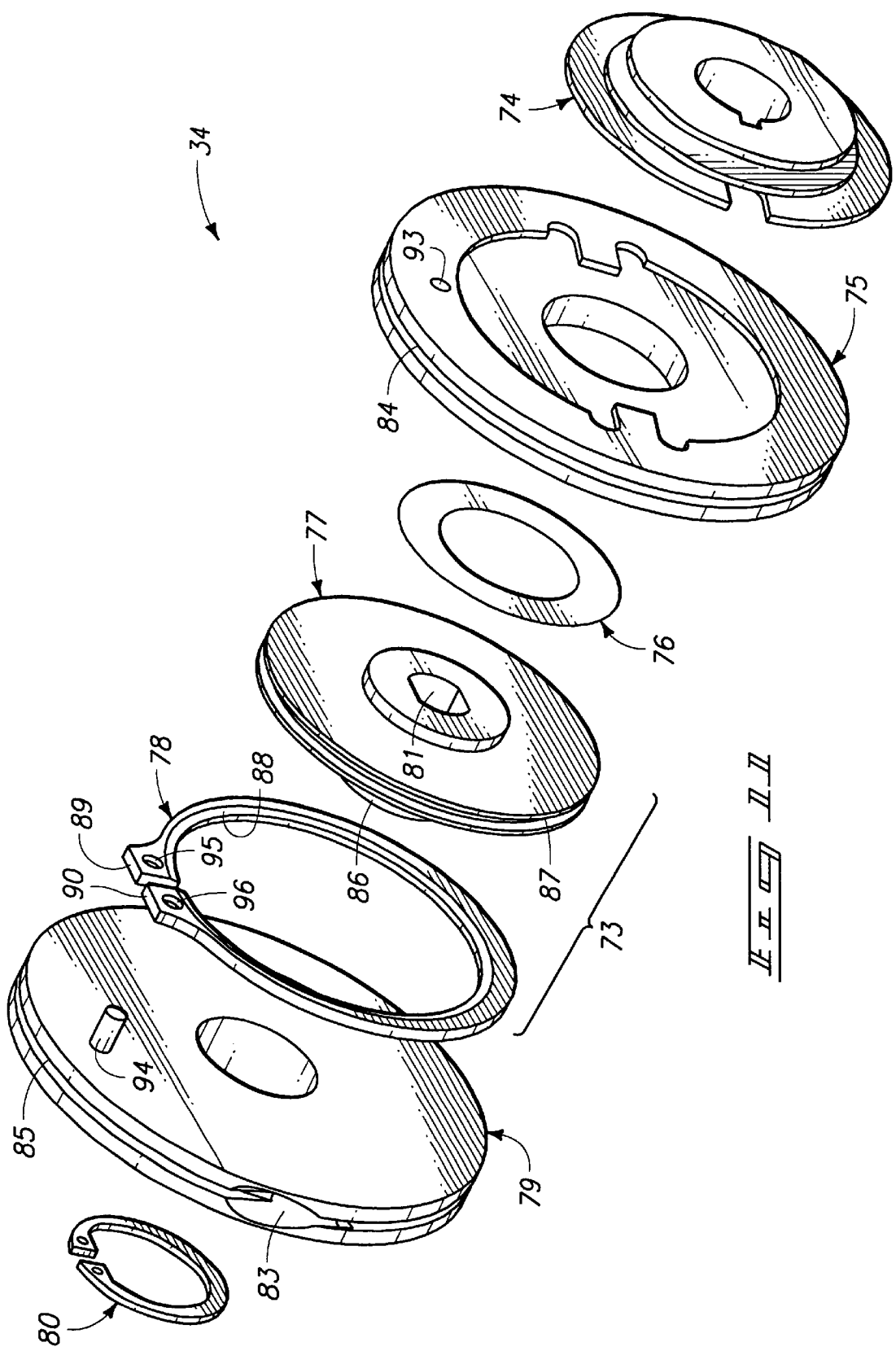
FIG. 11 is an exploded view of one embodiment of a lock assembly of the shift mechanism.

Referring to FIG. 11, one embodiment of lock assembly 34 is shown in detail. Other lock assemblies 34 can be utilized in other embodiments. Lock assembly 34 is configured to couple with mount assembly 32 and lock the position of eccentric mount 37 relative to mount support 36 and central axle 20. Locking of eccentric mount 37 reduces application of feedback forces to control assembly 12.

In particular, lock assembly 34 operates in the preferred embodiment to lock eccentric mount 37 at any desired location intermediate and including the first extreme position and the second extreme position. Such positions eccentric mount 37 at a desired location providing a desired gear ratio of transmission 11 while overcoming resultant forces which urge orbiter 19 and eccentric mount 37 towards the first extreme position.

The depicted lock assembly 34 comprises a bearing race 74, upshift member 75, washer 76, retaining disk 77, retaining member 78, downshift member 79, and ring 80. Components 74–80 of lock assembly 34 are configured to receive central axle 20. Ring 80 is operable to maintain downshift member 79 coupled with retaining member 77. Ring 80 can be attached to a shaft 86 of member 77.

Bearing race 74 is preferably fixedly attached to shift tube 57. Such is accomplished by spot welding in one exemplary embodiment. Bearing race 74 and upshift member 75 are keyed for mated coupled rotation about central axle 20. Responsive to an external force applied to upshift member 75 from control assembly 12, member 75 and race 74 rotate causing rotation of shift tube 57 in a first direction (e.g., clockwise) and upshift gear adjustment of transmission 11. Force can also be applied to downshift member 79 from control assembly 12 providing rotation of race 74 and shift tube 57 in a second direction (e.g., counter-clockwise) opposite the first direction.

Figure 12:
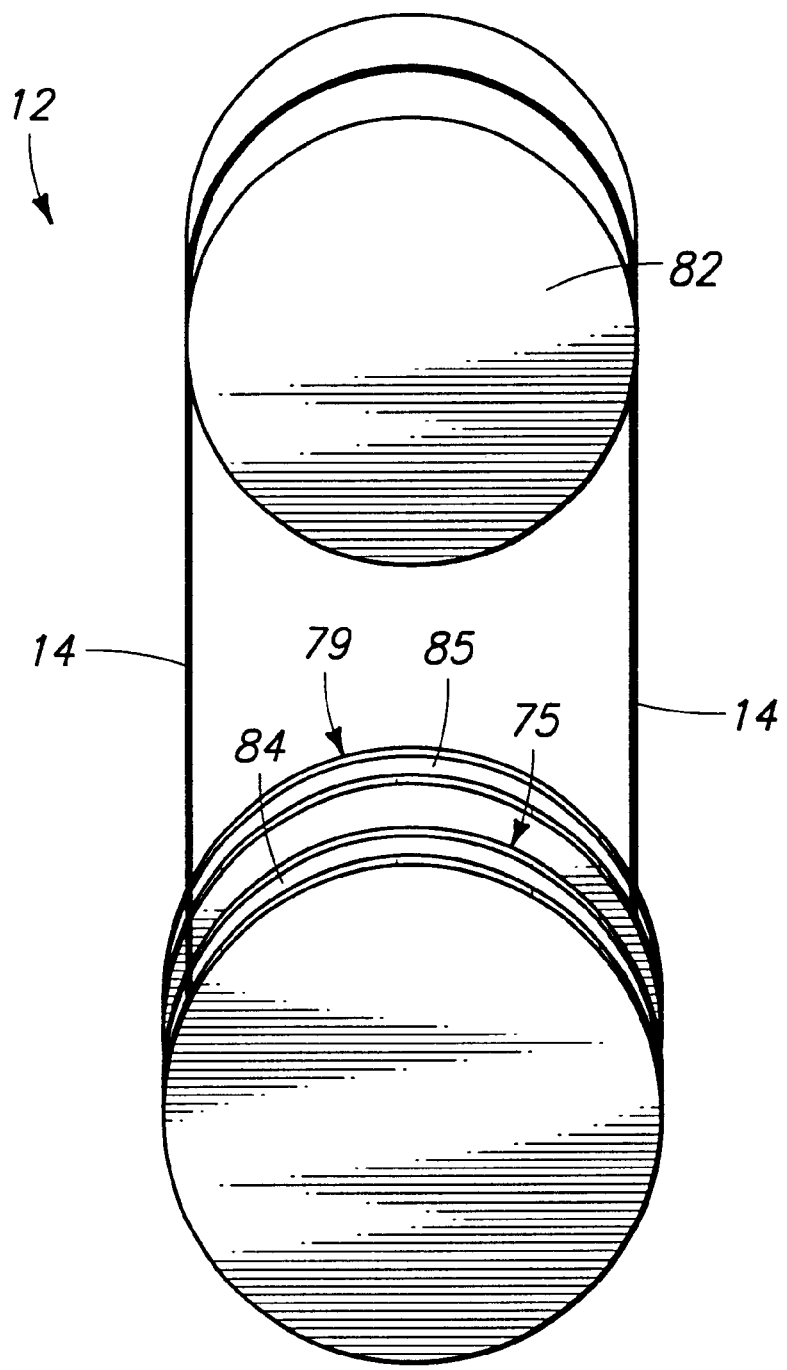
FIG. 12 is a diagrammatic representation of a control assembly coupled with plural shift members of the lock assembly.

Referring to FIG. 12, control assembly 12 comprises a twist grip type controller 82. Controller 82 can be conveniently located upon the handlebars of bicycle 10 and configured to rotate in first and second directions providing respective upshift and downshift operations.

In particular, controller 82 is coupled with cables 14 in the described embodiment. A single continuous cable or two separate cables can be provided. Upshift member 75 and downshift member 79 are coupled with cables 14 connected with controller 82 of control assembly 12. In particular, upshift and downshift members 75, 79 include respective pockets for receiving cables 14 (pocket 83 corresponding to downshift member 79 is illustrated in FIG. 11). Upshift and downshift members 75, 79 include respective grooves 84, 85 operable to receive cables 14 as also illustrated in FIG. 11.

Upshift member 75 is coupled with mount assembly 32 via shift tube 57 and shift gear 55. Upshift member 75 is configured to provide movement of eccentric mount 37 in a first direction toward the second extreme position. Rotation of controller 82 in a first direction (clockwise in FIG. 12) provides clockwise rotation of upshift member 75 and upshifting or a higher gear ratio within transmission 11. Rotation of controller 82 in a second direction (counter-clockwise in FIG. 12) provides counter-clockwise rotation of downshift member 79 and a lower gear ratio within transmission 11. Downshift member 79 is coupled with upshift member 75 and retaining member 78 and is configured to provide movement of eccentric mount 37 in a second direction toward the first extreme position. More specifically, downshift member 79 is configured to unlock spring 78 relative to retaining disk 77 and provide movement of eccentric mount 37 in the second direction. Other control assembly configurations 12 can be utilized.

Referring again to FIG. 11, retaining assembly 73 comprising disk 77 and spring 78 are provided about central axle 20. Retaining disk 77 includes a keyed central aperture 81. Aperture 81 is configured to receive central axle 20. Retaining disk 77 is fixed in a given orientation relative to central axle 20 in the described embodiment. Retaining disk 77 includes a beveled groove 87 configured to mate with an inner surface 88 of retaining member 78.

Retaining member 78 preferably comprises a spring having plural ears 89, 90. Retaining member 78 is coupled with upshift member 75 and is configured to lock the position of upshift member 75 and eccentric mount 37. In a preferred embodiment, groove 87 and surface 88 are formed at mating 30° angles so retaining member or spring 88 can be received within groove 87 of retaining disk 77. Spring tension of retaining member 78 operates to oppose rotation of retaining member 78 and upshift member 75 with respect to retaining disk 77 and central axle 20.

As referred to above, upshift member 75 is configured to rotate about central axis 20 of transmission 11 and implement an upshift gearing operation of transmission 11. Downshift member 79 is configured to rotate about central axle 20 of transmission 11 and implement a downshift gearing operation of transmission 11. Retaining member 78 is coupled with upshift member 75 and downshift member 79 and is configured to rotate about retaining disk 77 responsive to rotation of one of upshift member 75 and downshift member 79.

Retaining member 78 is further configured to lock the position of upshift member 75 relative to retaining disk 77. More specifically, spring tension of retaining member 78 operates to lock upshift member 75 and retaining member 78 relative to central axle 20 and retaining disk 77.

Referring to FIG. 13 and FIG. 14, locking operations of retaining assembly 73 are described. Referring to FIG. 13, spring tension operates to lock retaining ring 78 with retaining disk 77. Such locks the position of upshift member 75 relative to central axle 20. Referring to FIG. 14, deformation of retaining member 78 permits rotation of retaining member 78 and shift members 75, 79 relative to retaining disk 77. Rotation of controller 82 within control assembly 12 causes direct rotation of one of upshift member 75 and downshift member 79 depending upon the direction of rotation of controller 82 operating to deform spring 78.

Referring to FIG. 13, spring 78 is locked in position relative to retaining member 77. Shift members 75, 79 include respective pins 93, 94 which are configured for engagement within respective apertures 95, 96 of ears 89, 90. Rotation of controller 82 of control assembly 12 in a first direction (e.g., clockwise with reference to FIG. 12) causes direct clockwise rotation of shift member 75 and pin 93 providing upshift operations. Although member 75 is not shown in FIG. 13 and FIG. 14, pin 93 extends therefrom and engages aperture 95 of ear 89.

Clockwise rotation of upshift member 75 moves pin 93 in an outward clockwise direction forcing ear 89 of spring 78 outwards thereby overcoming the spring tension of member 78 and permitting rotation of retaining member 78 with respect to disk 77. Spring 78 is shown deformed in FIG. 14 responsive to movement of pin 93. Deformed spring 78 has a larger inner diameter permitting rotation of retaining member 78 and member 75 about retaining disk 77. Rotation of upshift member 75 operates to rotate bearing race 74 and shift tube 57 and shift gear 55 coupled therewith implementing upshift operations of transmission 11.

During upshift operations, spring 78 deforms permitting rotation of spring 78 in a clockwise direction with respect to retaining disk 77. Rotation of spring 78 imparts a clockwise rotational force to downshift member 79 via ear 90 and pin 94. In one sense, spring 78 operates to drag downshift member 79 in a clockwise direction during upshift rotation of controller 82.

Following the removal of a twisting action upon controller 82 of control assembly 12, spring 78 returns to the position shown in FIG. 13 and locks upshift member 75 with respect to central axle 20. In particular, retaining assembly 73 operates to lock the orientation of upshift member 75 with respect to retaining disk 77 and central axle 20. Thus, using controller 82, an operator can lock the retaining member 78 with respect to disk 77 during an upshift operation to provide an intermediate gear ratio of transmission 11 intermediate the first extreme position and the second extreme position.

During downshift operations, controller 82 of control assembly 12 rotated in an opposing direction (e.g., counter-clockwise with reference to FIG. 12) causing counter-clockwise rotation of downshift member 79 and pin 94. Counter-clockwise rotation of downshift member 79 and pin 94 deforms spring 78 permitting rotation of spring 78 about disk 77 in a counter-clockwise direction. Counter-clockwise rotation of downshift member 79 operates to drag spring 78 and upshift member 75 in a counter-clockwise direction. Such implements downshifting operations inasmuch as rotation of upshift member 75 in a counter-clockwise direction causes counter-clockwise rotation of shift tube 57 and shift gear 55.

Further, the resultant forces including the downforce and tangential force described above also operate to assist with downshifting operations. The resultant forces urge orbiter 19 and eccentric mount 37 towards the first extreme position. The operator can remove a twisting force applied to controller to lock the position of eccentric mount 37 and the gear ratio of transmission 11.

Using controller 82, an operator can lock the retaining member 78 with respect to disk 77 during a downshift operation to provide an intermediate gear ratio of transmission 11 intermediate the first extreme position and the second extreme position.

Referring to FIG. 15, upshift member 75 includes a receiving groove 98 in the surface facing retaining assembly 73. Retaining groove 98 is configured to receive pin 94 of downshift member 79. During downshift operations, groove 98 is arranged to prevent over-rotation of downshift member 79 as a result of the resultant tangential force and downforce and/or counter-clockwise rotation of controller 82. During the downshift operation, pin 94 moves in a clockwise direction as shown in FIG. 15 and is retained by the right end of groove 98 from over-rotation. Such tends to reduce strain upon retaining member 78.

Figure 16:
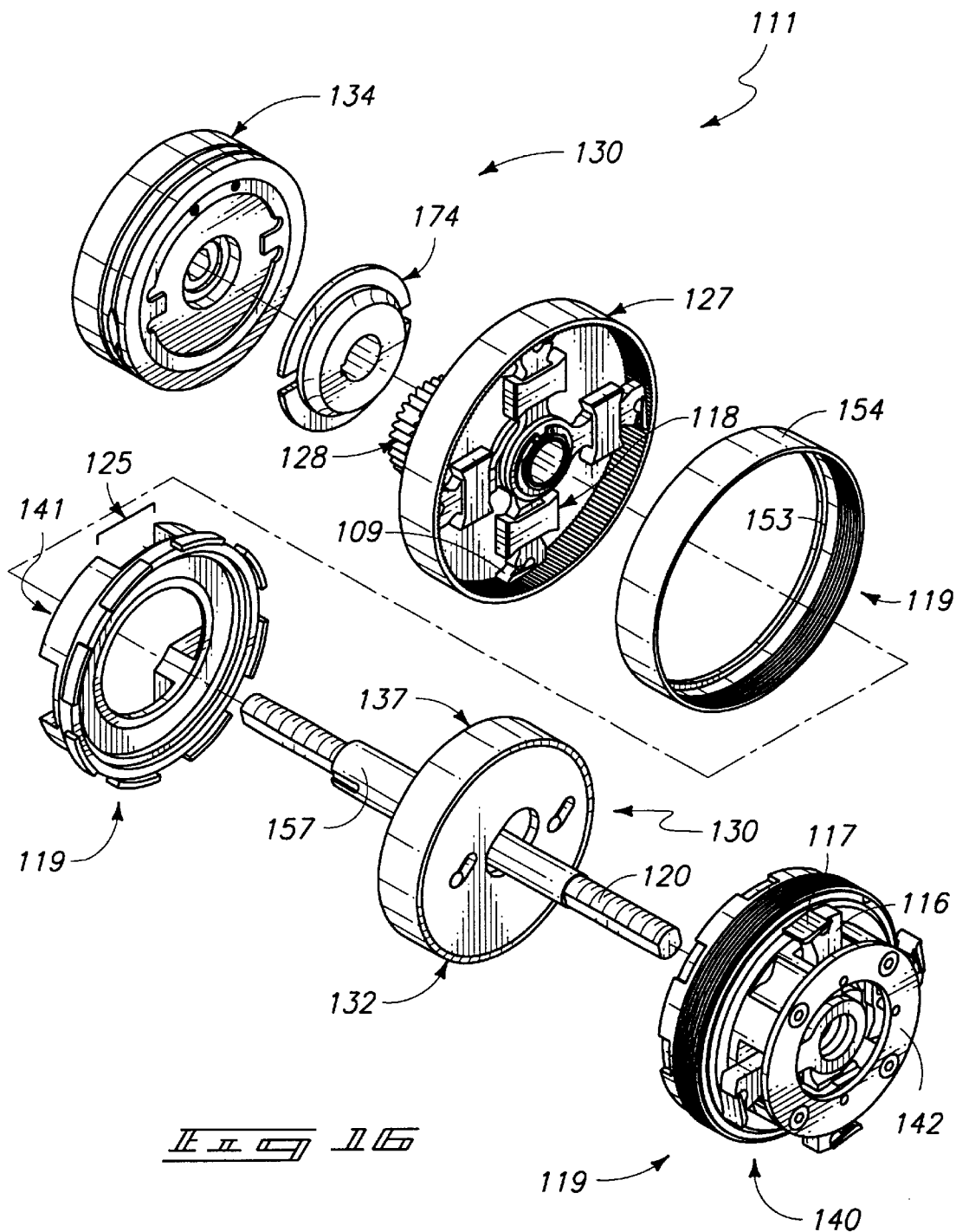
FIG. 16 is an exploded view of another transmission configuration.

Referring to FIG. 16, an alternative embodiment of a continuously variable transmission 111 is illustrated in detail. The depicted embodiment of continuously variable transmission 111 is provided in a bicycle application. Transmission 111 is utilized in other applications in other embodiments. The rear wheel of a bicycle or other vehicle is configured to rotate about a central axle 120. Central axle 120 defines a central axis X—X (shown in FIG. 17).

During operation of transmission 111, it has been observed that the application of a drive force tends to drive the transmission to a 1:1 or direct ratio. Such facilitates shifting from a high speed to a lower speed. However, more effort is required to shift from a lower speed to a higher speed.

More specifically, increasing eccentric offset imparts increased vane angularity, and incoming radial force attempts to normalize at an angle perpendicular to the axes of the vanes. Further, shift forces are additive forces acting between the vanes and the orbiter which produce alternating overturning axial forces and alternating radial positive and negative forces upon the input vanes and the output vanes. These radial forces comprise the primary forces responsible for the tendency to drive the continuously variable transmission to a concentric direct ratio. Although these resultant forces aid in downshifting the continuously variable transmission, such require the expenditure of additional force to implement upshift operations.

A shift mechanism 130 of transmission 111 is illustrated in FIG. 16. The depicted shift mechanism 130 includes a mount assembly 132, a lock assembly 134, a shift controller 157, and a bearing race 174. Mount assembly 132 includes a mount support 136 and an eccentric mount 137.

Transmission 111 according to the present invention is configured to minimize the effect of such resultant forces upon shifting operations. As described below, shift mechanism 130 of transmission 111 is configured to minimize the effect of such resultant forces upon movement of eccentric mount 137 relative to mount support 136 during shifting operations.

Mount support 136 forms a boss in the presently described embodiment which is provided about central axle 120. Eccentric mount 137 defines an eccentric axis E—E. An orbiter 119 of transmission 111 is configured to rotate about eccentric axis E—E and eccentric mount 137 of mount assembly 132 as described in detail below.

Eccentric mount 137 is movably coupled with mount support 136 to provide radial adjustment of eccentric axis E—E relative to central axis X—X. Mount support 136 is configured in the described arrangement to fit closely inside eccentric mount 137 allowing motion of eccentric mount 137 substantially in a single plane substantially perpendicular to axis X—X of central axle 120. Such serves to maintain mechanism rotation substantially in the single plane in spite of the alternating overturning moments imparted to eccentric mount 137.

Radial adjustment of the position of eccentric mount 137 (and eccentric axis E—E) with respect to mount support 136 and central axis X—X adjusts the gear ratio of transmission 111. As described in detail below, eccentric mount 137 is movable along a path of travel intermediate a first position and a second position during adjustment of the gear ratio of the associated transmission 111 (the first position and the second position of eccentric mount 137 relative to mount support 136 are described below with reference to FIG. 19 and FIG. 20, respectively). Eccentric axis E—E is coaxial with central axis X—X when eccentric mount 137 is provided in the first position.

In addition, eccentric mount 137 can be maintained or locked at any position intermediate the first position and second position to provide the desired gear ratio. Lock assembly 134 is provided in the described embodiment to assist with such locking operation.

Orbiter 119 is also configured for rotation about central axle 120. Orbiter 119 comprises right portion 140, left portion 141 and a coupling 154 in the depicted embodiment. Coupling 154 includes internal threads configured to mate with external threads of right orbiter portion 140. Coupling 154 additionally includes an internal lip 153 configured to retain left orbiter portion 141 coupled with right orbiter portion 140 following assembly.

Right orbiter portion 140 is configured to receive a plurality of input vanes 116. A cover plate 142 is removed in FIG. 21 to illustrate coupling of input vanes 116 with right portion 140 of orbiter 119. Left orbiter portion 141 includes a plurality of slots 125 configured to couple with plural output vanes 118.

Input vanes 116 and output vanes 118 are configured for rotation about central axle 120. Orbiter 119 is provided to operably couple a drive member and a driven member using input vanes 116 and output vanes 118 as described below. Input vanes 116 individually include a tooth 117 configured to engage an input drive member such as an input ratchet, or other drive member, as described below. Output vanes 118 individually include a tooth 109 configured to engage an output ratchet 127.

Orbiter 119 is configured for rotational movement about the variable eccentric axis E—E of eccentric mount 137. Eccentric axis E—E is coaxial with central axis X—X in FIG. 16. The axis of rotation of orbiter 119 is radially adjustable with respect to central axis X—X using eccentric mount 137. Adjustment of the axis of rotation of orbiter 119 adjusts the gear ratio of transmission 111 as described in detail in the '702 patent.

Figure 17:
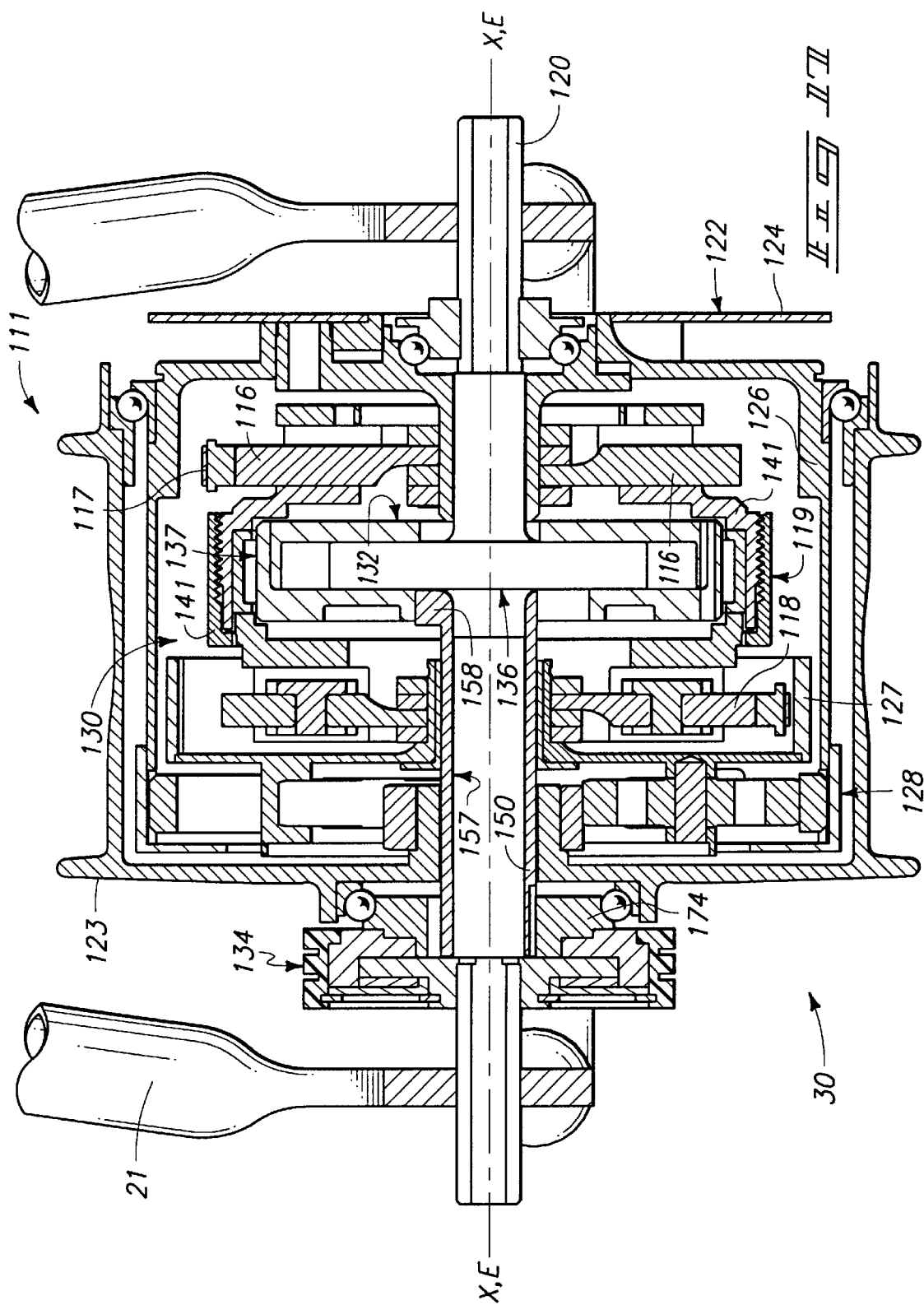
FIG. 17 is a cross-sectional view of the transmission of FIG. 16 mounted upon a frame of a bicycle.

Referring to FIG. 17, transmission 111 is depicted mounted within a rear hub of bicycle 10. In particular, transmission 111 is mounted upon central axle 120 which comprises the rear axle of bicycle 10 in the depicted embodiment. Central axle 120 is received within frame 21 of bicycle 10. In the preferred embodiment, central axle 120 is keyed for receipt within frame 21 of bicycle 10. Preferably, central axle 20 is locked to frame 21 in a fixed relationship or orientation.

Transmission 111 is coupled intermediate a drive member 122 and driven member 123. Members 122, 123 comprise individual rotatable members. Drive member 122 and driven member 123 are configured to rotate about central axle 120 responsive to an application of a driving force (e.g., an external peddling force input via crank 13) to drive member 122.

In the depicted arrangement, drive member 122 includes a drive sprocket 124 and an input ratchet 126. Drive sprocket 124 of drive member 122 operates as an input drive element which is chain driven from crank 13. Drive member 122 is additionally operably coupled with input ratchet 126 to impart driving force to input ratchet 126.

Driving engagement is provided between a drive ring of input ratchet 126 and teeth 117 of input vanes 116 (the input vanes 116 depicted in FIG. 17 are individually shown in a spaced position relative to input ratchet 126). Input vanes 116 receive the drive force and impart the drive force to orbiter 119 as described further below. Further, orbiter 119 imparts the drive force to output vanes 118 and driven member 123.

One embodiment of driven member 123 comprises a bicycle wheel hub. Driven member or hub 123 is operably coupled to output ratchet 127 via a planetary gear assembly 128. Driven member 123 and output ratchet 127 are configured to rotate about central axis X—X in response to sequential driving engagement between teeth 109 of output vanes 118 and a driven ring of output ratchet 127. Additional driving engagement and other transmission operations are described in further detail in the '702 patent.

In the described configuration, shift mechanism 130 is operable to adjust transmission 111 responsive to shift forces inputted via control assembly 12 described above. In particular, shift mechanism 130 is configured to adjust the gear ratio of transmission 111 intermediate drive member 122 and driven member 123. Transmission 111 provides an adjustable gear ratio within a range of 1 to 1 and 3.5 to 1 in the described embodiment.

More specifically, orbiter 119 is operable to concentrically rotate about eccentric mount 137. Orbiter 119 is further configured to rotate in a selectively controlled offset location relative to central axle 120 to implement shifting operations. Thrust bearings and radial bearings (not shown) are provided intermediate orbiter 119 and eccentric mount 137 in one embodiment to mitigate overturning and radial forces present during operation of transmission 111. The operator of bicycle 10 can control the gearing ratio of transmission 10 by adjustment of the position of eccentric mount 137 (and eccentric axis E—E defined thereby) relative to central axle 120 and central axis X—X.

Lock assembly 134 is mounted about central axle 120 and outside of driven member 123 in the depicted embodiment. A shift controller 157 couples lock assembly 134 with mount assembly 132 in the described embodiment. The illustrated shift controller 157 includes a shift tube 150 coupled in fixed rotational movement with bearing race 174 and an offset circular cam 158 configured to engagingly couple with eccentric mount 137. Lock assembly 134 is provided to lock the position of eccentric mount 137 relative to mount support 136 and central axle 120.

Referring to FIG. 18, additional details of mount assembly 132 of shift mechanism 130 are illustrated. The orientation of mount assembly 132 is reversed in FIG. 18 compared with FIG. 17. Mount support 136 forms a boss provided upon central axle 120. In the depicted arrangement, mount support 136 is affixed to central axle 120 in a predefined orientation. In particular, mount support 136 does not move with respect to central axle 120. Given the fixed relationship of mount support 136 with respect to central axle 120 and frame 21, displacements of eccentric mount 137 occur along a predefined path of travel defined by mount support 136 intermediate the first position and second position responsive to input from control assembly 12.

Eccentric mount 137 includes opposing portions 131, 133. Eccentric mount portion 131 has a slightly smaller radius than portion 133 such that portion 131 fits within portion 133. More specifically, portions 131, 133 form a unitary eccentric mount 137 about mount support 136 once assembled.

Eccentric mount portion 133 includes a slot 145 configured to receive offset cam 158. Shift controller 157 controls the eccentricity of eccentric mount 137 and the gear ratio of transmission 111 responsive to input from control assembly 12. A user can supply shift forces to shift controller 157 via control input 12 in the described embodiment. Such permits external control of the offset position of eccentric mount 137.

Mount support 136 includes plural bores 138 as shown. Eccentric mount portion 131 and portion 133 individually include contoured cam slots 143 as shown. Plural pins 144 are provided within mount support 136. More specifically, pins 144 are received within bores 138 of mount support 136. Pins 144 are preferably shouldered to maintain axial relationship within mount support 136. Pins 144 are additionally received within respective contoured cam slots 143 within eccentric mount portions 131, 133 during assembly of shift mechanism 130. This depicted arrangement provides eccentric mount 137 movably coupled with mount support 136.

The arrangement of mount assembly 130, including shouldered pins 144 and contoured cam slots 143, is configured to minimize the effect of resultant forces upon movement of eccentric mount 137 relative to mount support 136 intermediate the first position and the second position during shifting of transmission 111. Such resultant forces are generated responsive to the eccentric axis E—E of eccentric mount 137 being spaced from the central axis X—X of central axle 120 as described above.

Contoured cam slots 143 define a path of travel for eccentric mount 137 intermediate the first position and second position. More specifically, contoured cam slots 143 are configured to receive respective pins 144 which form cam followers. The cam followers permit eccentric mount 137 to move in vectors allowed by contoured cam slots 143.

Resultant forces tend to drive continuously variable transmissions to the 1:1 direct ratio during operation as described previously. In one embodiment, vector directions of such resultant forces may be calculated at positions of eccentric mount 137 intermediate the first position and the second position.

Following calculation of the vector directions of the resultant forces, contoured cam slots 143 are configured in one arrangement to have cam surfaces which define a path of travel for eccentric mount 137 which is substantially perpendicular to the vector directions of the resultant forces at positions of eccentric mount 137 intermediate the first position and second position. More specifically, the surfaces of contoured cam slots 143 are constructed in such an arrangement to be substantially perpendicular to the resultant force vectors providing neutral force shifting.

Provision of contoured cam slots 143 which define a path of travel substantially perpendicular to vector directions of the resultant forces minimizes the effects of such resultant forces upon the movement of eccentric mount 137, and the overall shifting operation of the depicted shift mechanism 130.

In another arrangement, it may be desired to alter the shift characteristics. The surface profiles of contoured cam slots 143 are sloped away from perpendicular with respect to the calculated resultant force vectors such that the incoming resultant forces are biased either to increase offset or decrease offset.

In particular, in such alternative configurations, contoured cam slots 143 are altered to have differing slopes such that the resultant forces assist in movement of eccentric mount 137 in one direction intermediate the first position and the second position. For example, contoured cam slots 143 can be provided to aid with movement of eccentric mount 137 from the first position to the second position, or alternatively, from the second position to the first position.

In another configuration (not shown), the contoured cam slots are formed within mount support 136 and the pins are provided upon eccentric mount 137 and arranged for insertion within contoured cam slots 143.

Figure 20:
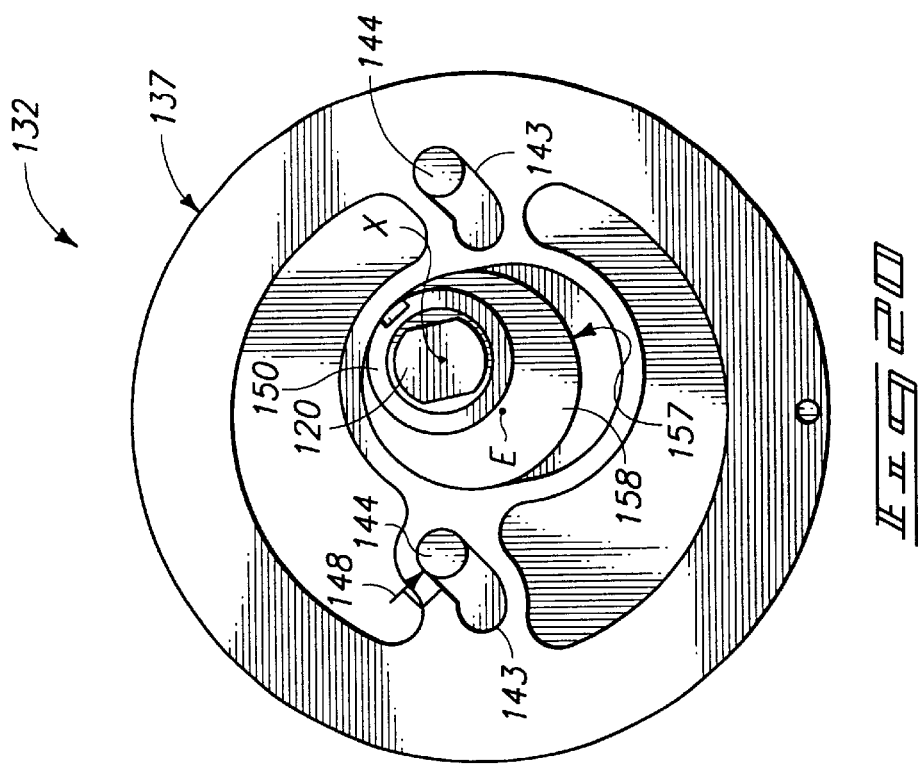
FIG. 20 is a side view of the eccentric mount in a second position.
Figure 19:
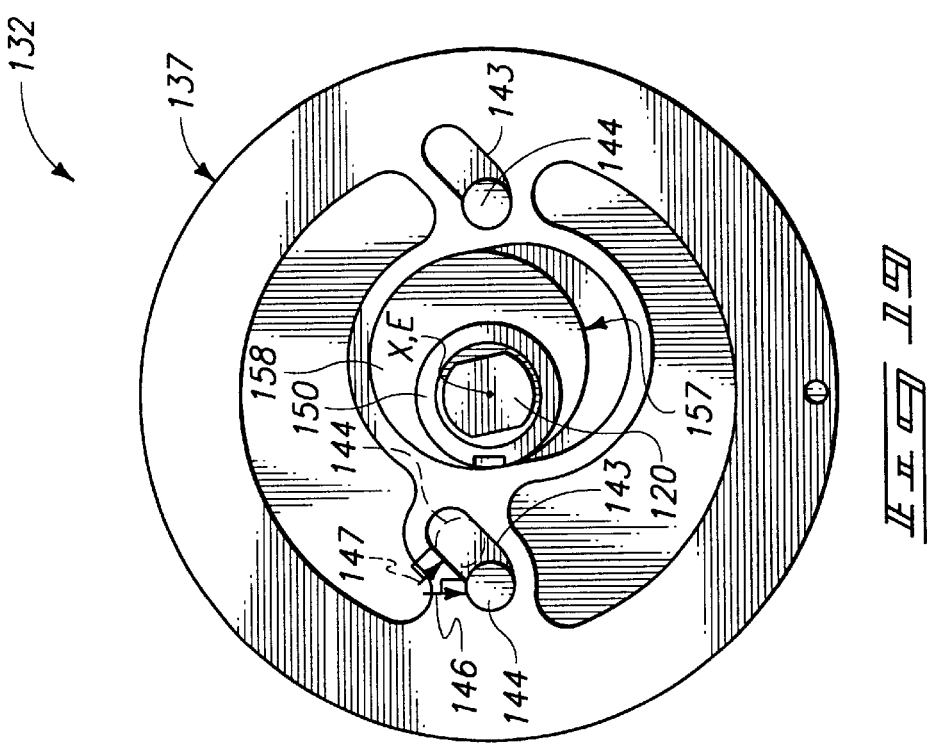
FIG. 19 is a side view of an eccentric mount of the mount assembly in a first position.

Referring to FIG. 19–FIG. 20, fully assembled mount assemblies 132 of shift mechanism 130 are shown. FIG. 19 illustrates eccentric mount 137 in the first position while FIG. 20 illustrates eccentric mount 137 in the second position. More specifically, the central axis and eccentric axis are provided in a coaxial arrangement in the first position illustrated in FIG. 19. Central axis X and eccentric axis E are provided in an eccentric relationship in the second position illustrated in FIG. 20.

Rotation of shift controller 157 implements movement of eccentric mount 137 intermediate the depicted first position and second position. Rotation of shift controller 157 responsive to input from control assembly 12 results in rotation of offset cam 158. Offset cam 158 is configured to adjust the eccentricity of eccentric mount 137 relative to mount support 136. Offset cam 158 is shown in different rotational orientations in FIG. 19 and FIG. 20.

Exemplary representations of vector directions of the resultant forces are illustrated in FIG. 19 and FIG. 20. For example, arrow 146 represents the vector direction of the resultant force corresponding to eccentric mount 137 being in the first position. Such is perpendicular to the surface of contoured cam slot 143 adjacent pin 144 when eccentric mount 137 is provided in the first position.

An abrupt change in the vector direction of the resultant forces occurs immediately following movement of eccentric mount 137 from the first position shown in FIG. 19 towards the second position. Accordingly, the orientation of the surfaces of contoured cam slots 143 drastically change only a slight distance away from the first position illustrated in FIG. 19.

Another exemplary resultant force is illustrated by arrow 147 in FIG. 19. Resultant force 147 corresponds to eccentric mount 137 being in a position intermediate the first position and the second position and corresponding to the position of pin 144 shown in phantom. As illustrated, the vector direction of the resultant force represented by arrow 147 is perpendicular to the portion of contoured cam slot 143 corresponding to the location of pin 144 in phantom.

Referring to FIG. 20, a resultant force created with eccentric mount 137 being in the second position is represented by arrow 148. The vector direction of the resultant force of arrow 148 is perpendicular to a surface portion of contoured cam slot 143 adjacent pin 144 in the second position. Such implements neutral force shifting in accordance with certain aspects of the present invention.

Figure 21:
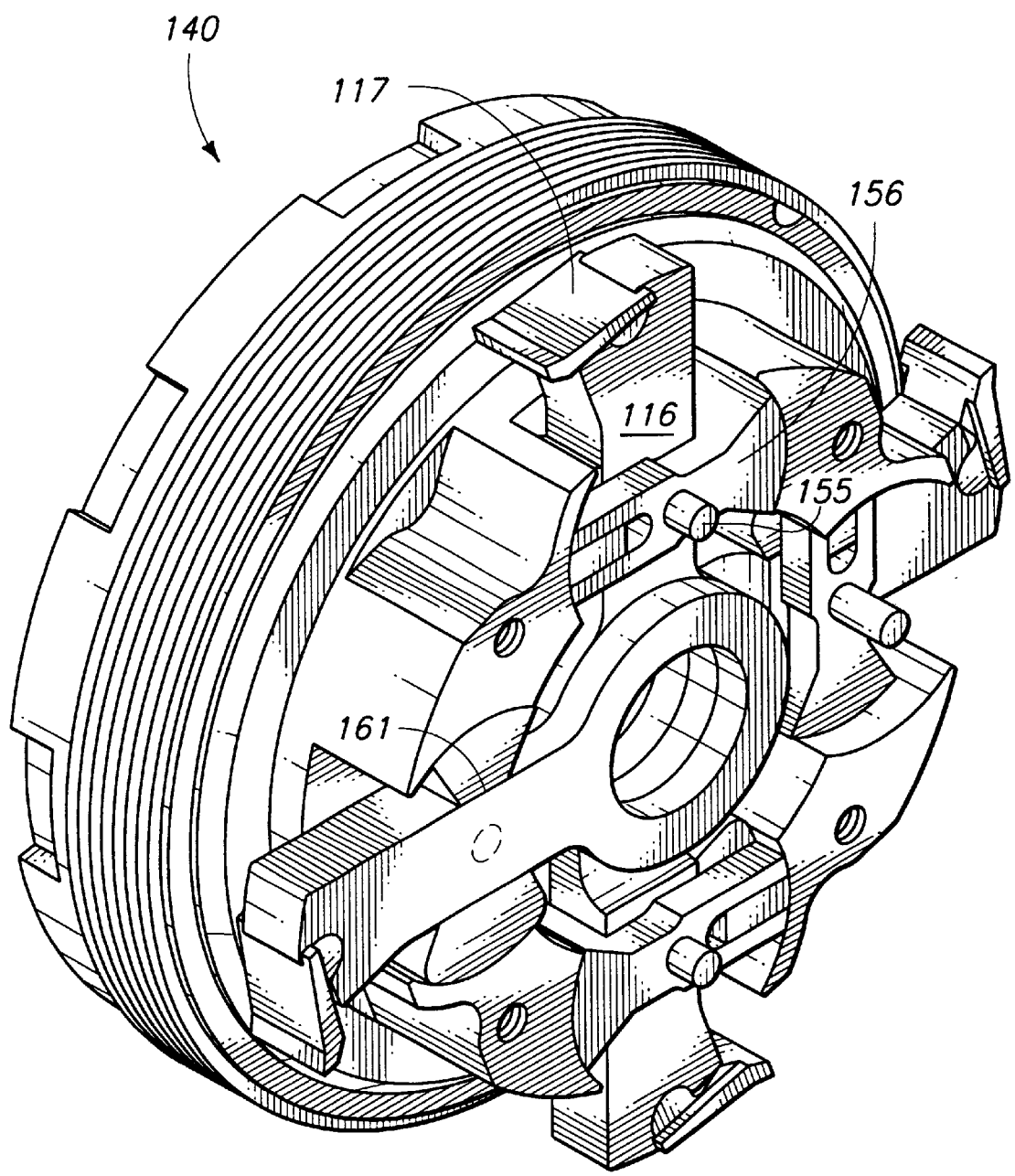
FIG. 21 is an isometric view of an input portion of an orbiter coupled with plural input vanes of the transmission.

Referring to FIG. 21, a right portion 140 of orbiter 119 is illustrated in conjunction with plural input vanes 116. Input vanes 116 are configured to receive drive forces from input ratchet 126 shown in FIG. 17. Input vanes 116 in turn impart the drive forces to orbiter 119.

Right portion 140 of orbiter 119 defines axes of rotation of respective input vanes 116. Such axes of rotation correspond to longitudinal axes of plural pins 155. Plural shoes 156 are provided within respective housings formed within right portion 140 of orbiter 119. Shoes 156 are configured to rotate about the axes represented by pins 155. Respective shoes 156 include internal slots 161 configured to receive respective input vanes 116. Such slots 161 permit linear radial movement of input vanes 116 relative to shoes 156.

The pawl or tooth 117 configured to engage input ratchet 127 of an individual vane 116 is also illustrated in detail in FIG. 21. Tooth 117 is biased outwardly by an appropriate biasing assembly, such as an internal ball and spring assembly (not shown) within vane 116, in the described embodiment.

Figure 22:
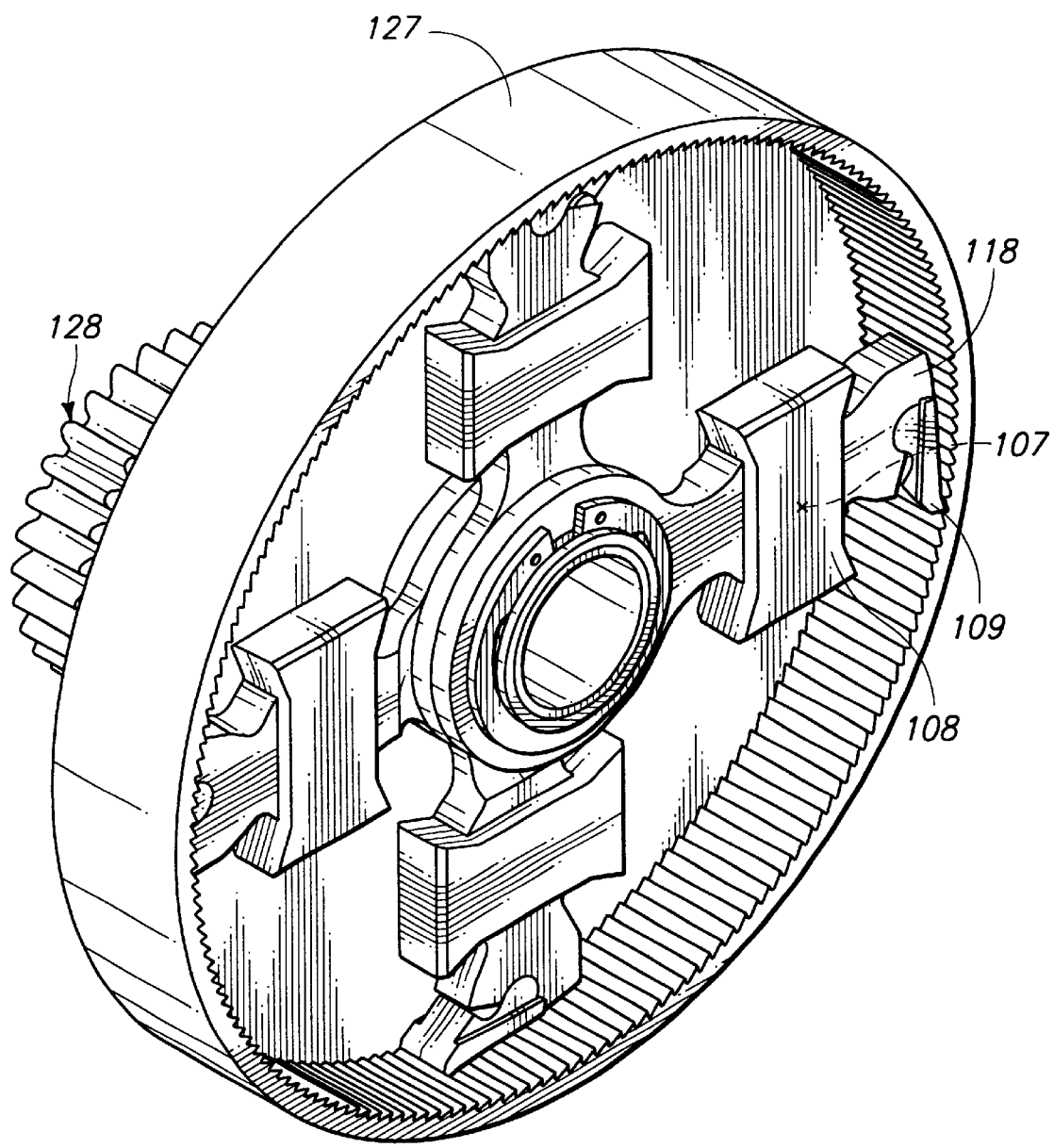
FIG. 22 is an isometric view of plural output vanes coupled with an output ratchet.

Referring to FIG. 22, a plurality of output vanes 118 are illustrated coupled with output ratchet 127. Similar to input vanes 116, teeth 109 of output vanes 118 are biased outwardly by an appropriate biasing assembly (not shown) in the described arrangement. Exemplary biasing assemblies include as an internal ball and spring assembly within output vanes 118. Output vanes 118 are configured to drive output ratchet 127 responsive to the application of the drive force from orbiter 119 to output vanes 118. In turn, output ratchet 127 thereafter drives driven member 123 via planetary gear assembly 128.

A plurality of sliders 108 are coupled with respective output vanes 118 as shown. More specifically, sliders 108 are coupled with output vanes 118 at respective axes 107 corresponding to internal pin couplings (not shown). Sliders 108 are sized and arranged for reception within slots 125 of left hand orbiter portion 153 shown in FIG. 16. Sliders 108 travel along linear paths of travel defined by associated slots 125. Respective output vanes are configured to rotate with respect to sliders 108 about axes 107 during operation of transmission 111.

Figure 23:
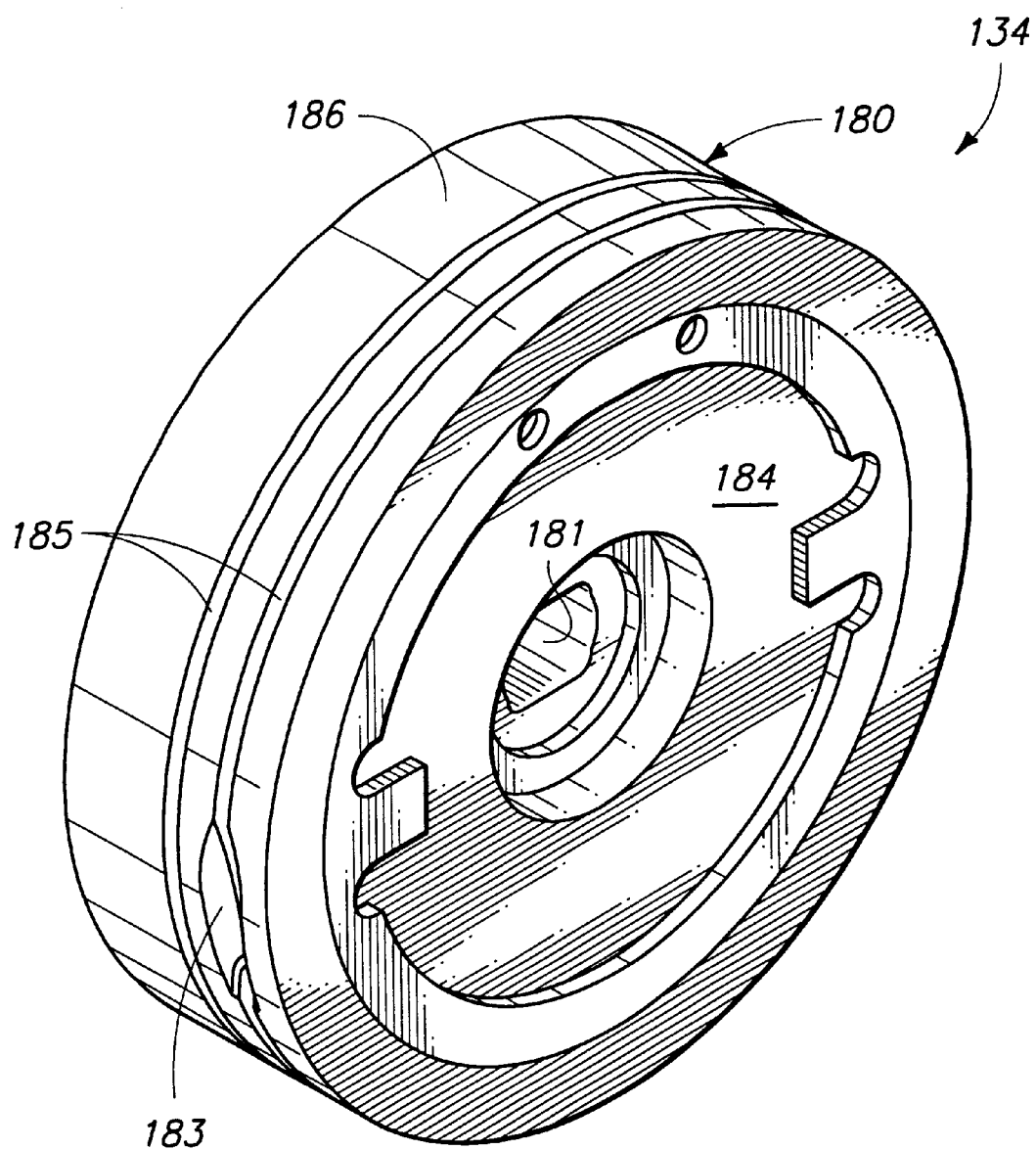
FIG. 23 is an isometric view of another lock assembly configuration.

Referring to FIG. 23, further details of lock assembly 134 for transmission 111 are illustrated. The depicted lock assembly 134 is configured to couple with mount assembly 132 to lock a position of eccentric mount 137 relative to mount support 136 using shift controller 157.

The depicted lock assembly 134 includes a keyed aperture 181 operable to receive axle 120. The depicted lock assembly 134 further includes a housing assembly 180 comprising a first housing 184 and a second housing 186. Housing assembly 180 is configured to rotate about central axle 120 responsive to shift forces imparted from control assembly 12. Housing assembly 180 is configured in the described embodiment to rotate in opposing directions about central axle 120 responsive to applied shift forces.

Housing 180 includes plural pockets 183 configured to receive cables 14 from control assembly 12 described above (plural pockets 183 are provided within housing 180 to provide rotation of lock assembly 134 in opposing directions although only one such pocket is illustrated in FIG. 23). Cables 14 are received within plural grooves 185 shown in FIG. 23.

Referring to FIG. 24, additional components of lock assembly 134 are illustrated. More specifically, first housing 184, second housing 186, a gear 188, and rings 190, 192 are shown. Gear 188 defines aperture 181 which is keyed to provide gear 188 in a fixed, non-rotational orientation relative to central axle 120.

Second housing 186 includes a shift member 189 and a shift plate 191. The illustrated shift member 189 includes a plurality of straight inner ridges 196 (only one such ridge 196 is shown in FIG. 24). The depicted shift plate 191 includes plural straight edges 193 which individually correspond to mate with respective straight inner ridges 196 of shift member 189. Accordingly, rotation of shift member 189 provides rotation of shift plate 191. Shift plate 191 includes a tang 187 as shown.

Housing assembly 180 is configured to rotate about gear 188 responsive to shift forces. First housing 184 of housing assembly 180 is keyed for coupling with bearing race 174 and shift controller 157 described above. Rotation of first housing 184 about gear 188 provides rotation of shift controller 157 and adjustment of the gear ratio of transmission 111.

Referring to FIG. 25, additional operational details of lock assembly 134 are described. First housing 184 includes plural pins 194 coupled with catches 195. Catches 195 are individually rotatable about pins 194 intermediate an engaged position mated with gear 188 and a spaced position separated from gear 188. The separated positions are represented in phantom by catches 195a. Catches 195 are biased in the engaged position as depicted. For example, internal springs (not shown) may be provided within first housing 184 to urge catches 195 toward the engaged positions.

Shift plate 191 rotates in either a clockwise or a counter-clockwise direction depending upon the direction of rotation of control assembly 12 and responsive to the application of a shift force from control assembly 12 to shift member 189.

During assembly, tang 187 of shift plate 191 (shift plate 191 is not shown in FIG. 25) is received intermediate catches 195 as illustrated. Rotational shift forces applied to plate 191 moves tang 187 towards one of catches 195 depending upon the direction of rotation. Tang 187 is configured to move one catch 195 responsive to rotation of second housing 186 in one direction and to move the other catch 195 responsive to rotation of second housing 186 in an opposite direction.

Movement of tang 187 in the clockwise or counter-clockwise direction moves the appropriate catch 195 from the engaged position to the spaced position responsive to the applied shift forces to permit rotation of housing assembly 180 about central axle 120 and gear 188. Such movement of housing assembly 180 effects rotation of shift controller 157 coupled with first housing member 184 and corresponding shifting of transmission 111.

Once the applied shift force is removed, catches 195 are biased into the engaged position and the position of housing assembly 180 is locked relative to central axle 120. Accordingly, the associated bearing race 174 and shift controller 157 are also locked into the corresponding position which maintains a constant locked gear ratio within transmission 111 until additional shift forces are applied via control assembly 12.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A transmission comprising:
   a mount assembly including a mount support adapted to couple about a central axle having a central axis, and an eccentric mount defining an eccentric axis and movably coupled with the mount support allowing radial adjustment of the eccentric mount relative to the central axle intermediate a first position and a second position to adjust a gear ratio of the transmission; and
   wherein resultant forces are generated responsive to the eccentric axis being spaced from the central axis, and the mount support and the eccentric mount are configured to reduce effects of the resultant forces upon the eccentric mount in positions intermediate the first position and the second position.

2. The transmission according to claim 1 further comprising:
   an orbiter configured to rotate about the eccentric mount and the eccentric axis;
   a plurality of input vanes configured to receive a drive force and to impart the drive force to the orbiter; and
   a plurality of output vanes configured to receive the drive force from the orbiter.

3. The transmission according to claim 2 wherein the orbiter defines axes of rotation of the input vanes and linear paths of travel of the output vanes.

4. The transmission according to claim 2 wherein the orbiter is configured to receive a plurality of rotatable input shoes and the input vanes are configured to slide through the input shoes.

5. The transmission according to claim 2 wherein the orbiter includes a plurality of slots and a plurality of sliders are rotatably coupled with the output vanes and configured to slide within the slots.

6. The transmission according to claim 1 wherein one of the mount support and the eccentric mount includes at least one pin and the other of the mount support and the eccentric mount includes at least one contoured cam slot configured to receive the pin to form a cam follower, and the contoured cam slot defines a path of travel for the eccentric mount intermediate the first position and the second position.

7. The transmission according to claim 6 wherein the contoured cam slot defines the path of travel substantially perpendicular to vector directions of the resultant forces.

8. The transmission according to claim 1 further comprising a shift controller comprising an offset cam configured to adjust the eccentricity of the eccentric mount relative to the mount support.

9. The transmission according to claim 1 further comprising a lock assembly coupled with the mount assembly and configured to lock a position of the eccentric mount relative to the mount support.

10. The transmission according to claim 1 wherein the mount support and the eccentric mount are configured to define a path of travel of the eccentric mount relative to the mount support which is substantially perpendicular to vector directions of the resultant forces.

11. A transmission comprising:
a mount assembly including a mount support adapted to couple about a central axle having a central axis, and an eccentric mount defining an eccentric axis and movably coupled with the mount support allowing radial adjustment of the eccentric mount relative to the central axle intermediate a first position and a second position to adjust a gear ratio of the transmission; and
wherein one of the mount support and the eccentric mount includes at least one pin and the other of the mount support and the eccentric mount includes at least one contoured cam slot configured to receive the pin to form a cam follower to define a path of travel for the eccentric mount intermediate the first position and the second position.

12. The transmission according to claim 11 further comprising:
an orbiter configured to rotate about the eccentric mount and the eccentric axis;
a plurality of input vanes configured to receive a drive force and to impart the drive force to the orbiter; and
a plurality of output vanes configured to receive the drive force from the orbiter.

13. The transmission according to claim 12 wherein the orbiter defines axes of rotation of the input vanes and linear paths of travel of the output vanes.

14. The transmission according to claim 12 wherein the orbiter is configured to receive a plurality of rotatable input shoes and the input vanes are configured to slide through the input shoes.

15. The transmission according to claim 12 wherein the orbiter includes a plurality of slots and a plurality of sliders are rotatably coupled with the output vanes and configured to slide within the slots.

16. The transmission according to claim 11 wherein the contoured cam slot defines the path of travel wherein resultant forces created responsive to the eccentric mount being in positions intermediate the first position and the second position assist in movement of the eccentric mount in at least one direction intermediate the first position and the second position.

17. The transmission according to claim 11 wherein the contoured cam slot defines the path of travel substantially perpendicular to vector directions of resultant forces created responsive to the eccentric mount being in positions intermediate the first position and the second position.

18. The transmission according to claim 11 further comprising a shift controller comprising an offset cam configured to adjust the eccentricity of the eccentric mount relative to the mount support.

19. The transmission according to claim 11 further comprising a lock assembly coupled with the mount assembly and configured to lock a position of the eccentric mount relative to the mount support.

20. A transmission adapted to couple with a central axle having a central axis, the transmission comprising:
a drive member configured to rotate about the central axle responsive to an application of a drive force to the drive member;
a driven member configured to rotate about the central axle responsive to the application of the drive force to the drive member;
an orbiter configured to couple the drive member and the driven member;
a mount assembly including a mount support adapted to couple about the central axle, and an eccentric mount coupled with the orbiter and defining an eccentric axis and being movably coupled with the mount support allowing radial adjustment of the eccentric mount and orbiter relative to the central axle intermediate a first position and a second position to adjust a gear ratio of the transmission; and
wherein resultant forces are generated responsive to the eccentric axis being spaced from the central axis, and the mount support and the eccentric mount are configured to reduce effects of the resultant forces upon the eccentric mount in positions intermediate the first position and the second position.

21. The transmission according to claim 20 further comprising:
a plurality of input vanes configured to receive a drive force from the drive member and to impart the drive force to the orbiter; and
a plurality of output vanes configured to receive the drive force from the orbiter and impart the drive force to the driven member.

22. The transmission according to claim 20 wherein the orbiter defines axes of rotation of the input vanes and linear paths of travel of the output vanes.

23. The transmission according to claim 20 wherein the orbiter is configured to receive a plurality of rotatable input shoes and the input vanes are configured to slide through the input shoes.

24. The transmission according to claim 20 wherein the orbiter includes a plurality of slots and a plurality of sliders are rotatably coupled with the output vanes and configured to slide within the slots.

25. The transmission according to claim 20 wherein one of the mount support and the eccentric mount includes at least one pin and the other of the mount support and the eccentric mount includes at least one contoured cam slot configured to receive the pin to form a cam follower, and the contoured cam slot defines a path of travel for the eccentric mount intermediate the first position and the second position.

26. The transmission according to claim 25 wherein the contoured cam slot defines the path of travel substantially perpendicular to vector directions of the resultant forces.

27. The transmission according to claim 20 further comprising a shift controller comprising an offset cam configured to adjust the eccentricity of the eccentric mount relative to the mount support.

28. The transmission according to claim 20 further comprising a lock assembly coupled with the mount assembly and configured to lock a position of the eccentric mount relative to the mount support.

29. A method of adjusting a gear ratio of a transmission comprising:

providing a transmission shift mechanism including a mount support coupled with an eccentric mount, and the mount support and the eccentric mount being configured to reduce effects of resultant forces upon the eccentric mount during the adjusting the gear ratio of the transmission; and moving the eccentric mount intermediate a first position and a second position relative to the mount support providing the adjusting and creating the resultant forces.

30. The method according to claim 29 wherein the moving comprises moving the eccentric mount along a path of travel substantially perpendicular to vector directions of the resultant forces.

31. The method according to claim 29 wherein the moving comprises moving the eccentric mount along a path of travel defined by a contoured cam slot within one of the mount support and the eccentric mount.

32. The method according to claim 29 further comprising locking a position of the eccentric mount relative to the mount support.

33. A method of adjusting a gear ratio of a transmission comprising:

providing a transmission shift mechanism including a mount support coupled with an eccentric mount which defines an eccentric axis;

providing the mount support about a central axle which defines a central axis; and moving the eccentric mount relative to the mount support intermediate a first position wherein the eccentric axis is coaxial with the central axis and a second position wherein the eccentric axis is spaced from the central axis to provide the adjusting, the moving further comprising moving the eccentric mount along a path of travel substantially perpendicular to vector directions of resultant forces created during the moving.

34. The method according to claim 33 wherein the moving comprises moving the eccentric mount along a path of travel defined by a contoured cam slot within one of the mount support and the eccentric mount.

35. The method according to claim 33 further comprising locking a position of the eccentric mount relative to the mount support.

36. A method of forming a transmission shift mechanism comprising:

providing a mount support;

providing an eccentric mount;

forming a contoured cam slot within one of the mount support and the eccentric mount substantially perpendicular to vector directions of resultant forces created during gear ratio adjusting of a transmission using the transmission shift mechanism;

providing a pin upon the other of the mount support and the eccentric mount; and coupling the pin within the contoured cam slot to guide moving of the eccentric mount relative to the mount support.

37. The method according to claim 36 further comprising providing a shift controller configured to control a position of the eccentric mount relative to the mount support.

38. The method according to claim 36 further comprising providing a lock assembly configured to lock a position of the eccentric mount relative to the mount support.

* * * * *